(12) United States Patent
Kingery

(10) Patent No.: US 9,272,886 B2
(45) Date of Patent: Mar. 1, 2016

(54) TENSIONING ASSEMBLY

(71) Applicant: Kenneth G. Kingery, Mesa, AZ (US)

(72) Inventor: Kenneth G. Kingery, Mesa, AZ (US)

(*) Notice: Subject to any disclaimer, the term of this patent is extended or adjusted under 35 U.S.C. 154(b) by 263 days.

(21) Appl. No.: 13/653,647

(22) Filed: Oct. 17, 2012

(65) Prior Publication Data

US 2014/0008593 A1 Jan. 9, 2014

Related U.S. Application Data

(60) Provisional application No. 61/548,140, filed on Oct. 17, 2011.

(51) Int. Cl.
*B21F 9/00* (2006.01)
*B66F 3/00* (2006.01)
*B66D 3/02* (2006.01)
*B60P 7/08* (2006.01)

(52) U.S. Cl.
CPC .. *B66D 3/02* (2013.01); *B60P 7/083* (2013.01)

(58) Field of Classification Search
USPC .......................... 254/371, 374–376, 393, 391
See application file for complete search history.

(56) References Cited

U.S. PATENT DOCUMENTS

| | | | | |
|---|---|---|---|---|
| 3,302,932 A * | 2/1967 | Wallin | ............................ | 254/390 |
| 4,151,980 A * | 5/1979 | Burton et al. | .................. | 254/371 |
| 4,580,766 A * | 4/1986 | Woodgate | ..................... | 254/371 |
| 4,603,839 A * | 8/1986 | Ekman et al. | .................. | 254/329 |
| D362,614 S | 9/1995 | Kingery | | |
| 5,722,640 A * | 3/1998 | Skyba | ............................ | 254/333 |
| 5,957,432 A * | 9/1999 | Ostrobrod | ..................... | 254/368 |
| 6,068,242 A * | 5/2000 | Kingery | ......................... | 254/391 |
| 6,070,858 A * | 6/2000 | Hase et al. | ..................... | 254/371 |
| 6,092,791 A * | 7/2000 | Kingery | ......................... | 254/371 |
| 6,149,133 A * | 11/2000 | Skyba | ............................ | 254/391 |
| 6,446,936 B1* | 9/2002 | Ostrobrod | ..................... | 254/368 |
| 7,562,862 B1 | 7/2009 | Jackson | | |
| 7,823,259 B2* | 11/2010 | Yang | ................................ | 24/298 |
| 2003/0085392 A1* | 5/2003 | Hsieh | ............................ | 254/369 |
| 2011/0204306 A1* | 8/2011 | Kingery | ......................... | 254/391 |

OTHER PUBLICATIONS

Website page, www.bmcintyrestudio.com, Quick Release Tie Down (1 page).
Website page, www.trupoint.com, Tight-Rope Tie Down (1 page).
Website page, www.qualitymarinesupply.com, On-line Boating Store (4 pages).
Website page, USA Products Group (3 pages).
Website page, www.drillspot.com, Rope Ratchet (1 page).
Website page, www.homehardware.com, Tie Down Rope (1 page).
Website page, www.ericksonmfg.com, Rope Ratchet (1 page).

(Continued)

*Primary Examiner* — Emmanuel M Marcelo
(74) *Attorney, Agent, or Firm* — The von Hellens Law Firm, Ltd.

(57) ABSTRACT

A ratchet for use with a cord includes a pair of opposed tear drop shaped members defining a one piece housing for rotatably supporting a one piece ratchet spool, for supporting a pivotally mounted thumb release and for supporting an angularly displaceable hook. Opposed circular cavities are disposed within the members to rotatably support corresponding bosses extending from opposed sides of the spool. A plurality of opposed interleaved non-radial ribs extend from opposed surfaces of the spool to frictionally grip a cord partially extending about the spool. A pair of wheels forming the spool are interlocked with and secured to one another through a key and keyway.

15 Claims, 14 Drawing Sheets

(56) References Cited

OTHER PUBLICATIONS

Website page, www.roperatchet.com, Rope Ratchet (2 pages).
Website page, www.toolking.com, Keeper 07007 Rope Wrangler Rope Tie Down (2 pages).
Website page, www.hamptonproducts.com, Rope Wrangler (1 page).
Website page, www.ropetiedowns.com, Rope Tie Downs, Inc. (1 page).
Website page, www.etrailer.com, Cargo Tie Downs (2 pages).
Website page, www.inlandtarp.net, Super Cinch Tie Down (1 page).
Website page, www.rockymountainhondapowerhouse.com, QuadPak Toughman Rope Clamp (1 page).
Website page, www.discountramps.com, Rope Tie Down (2 pages).
Website page, www.tieboss.com, Tie Down (2 pages).
Website page, www.qdmaqi.com, Rope Tie Down (1 page).
Website page, www.media.hydroponics.net, Rope Ratchet (1 page).
Advertisement, "Rope Ratchet Tie Down", Carolina North (2 pages).

* cited by examiner

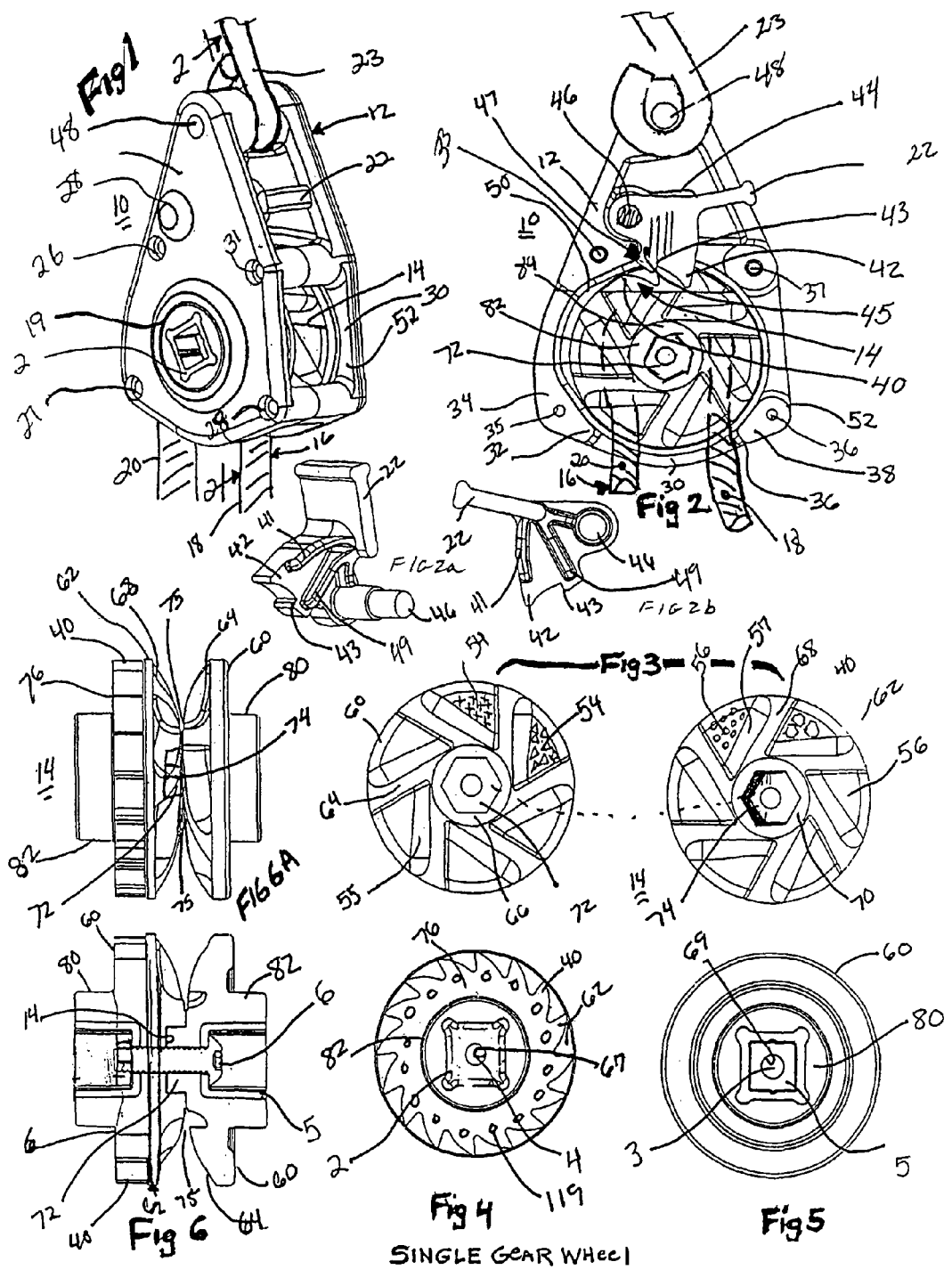

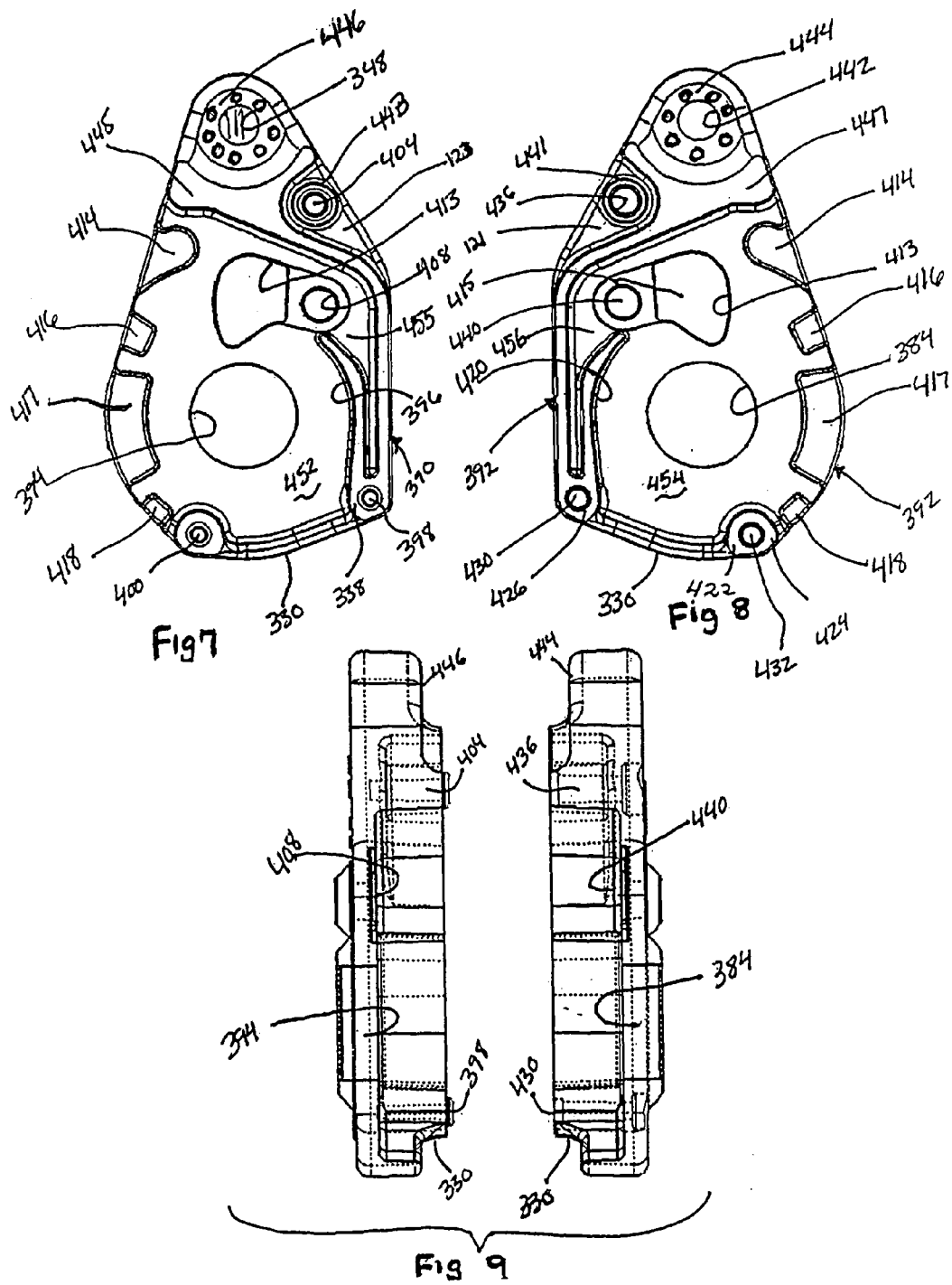

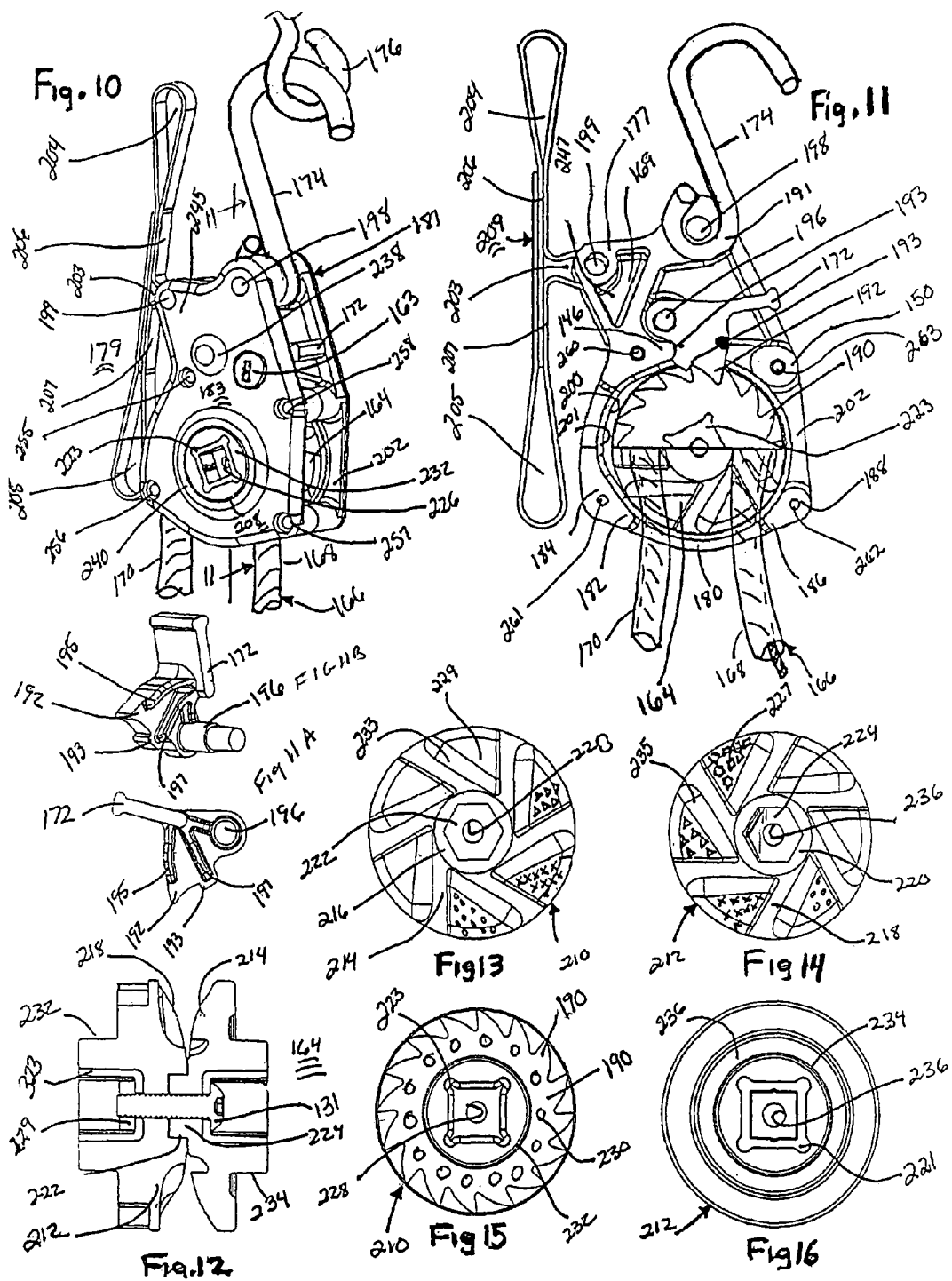

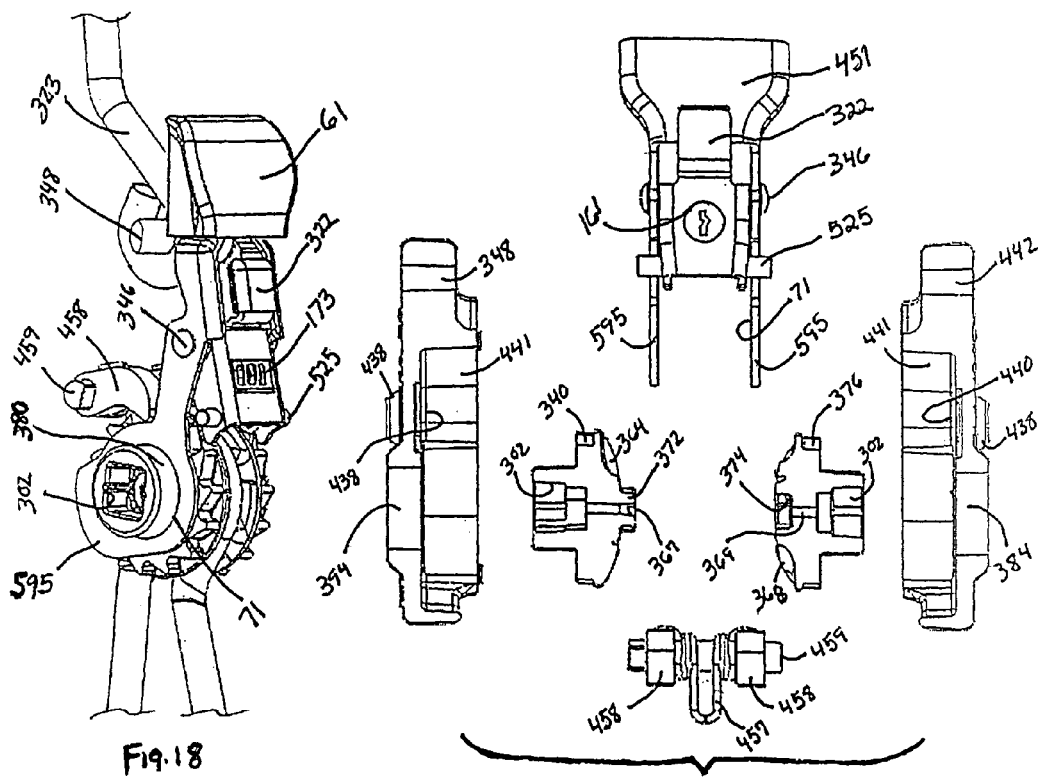
Fig. 18
Fig. 17
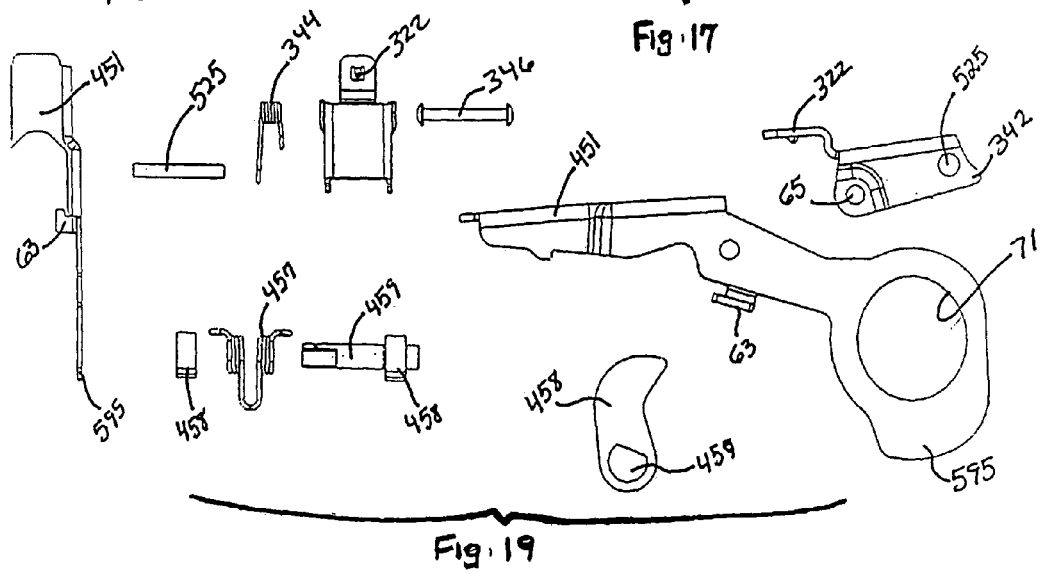
Fig. 19

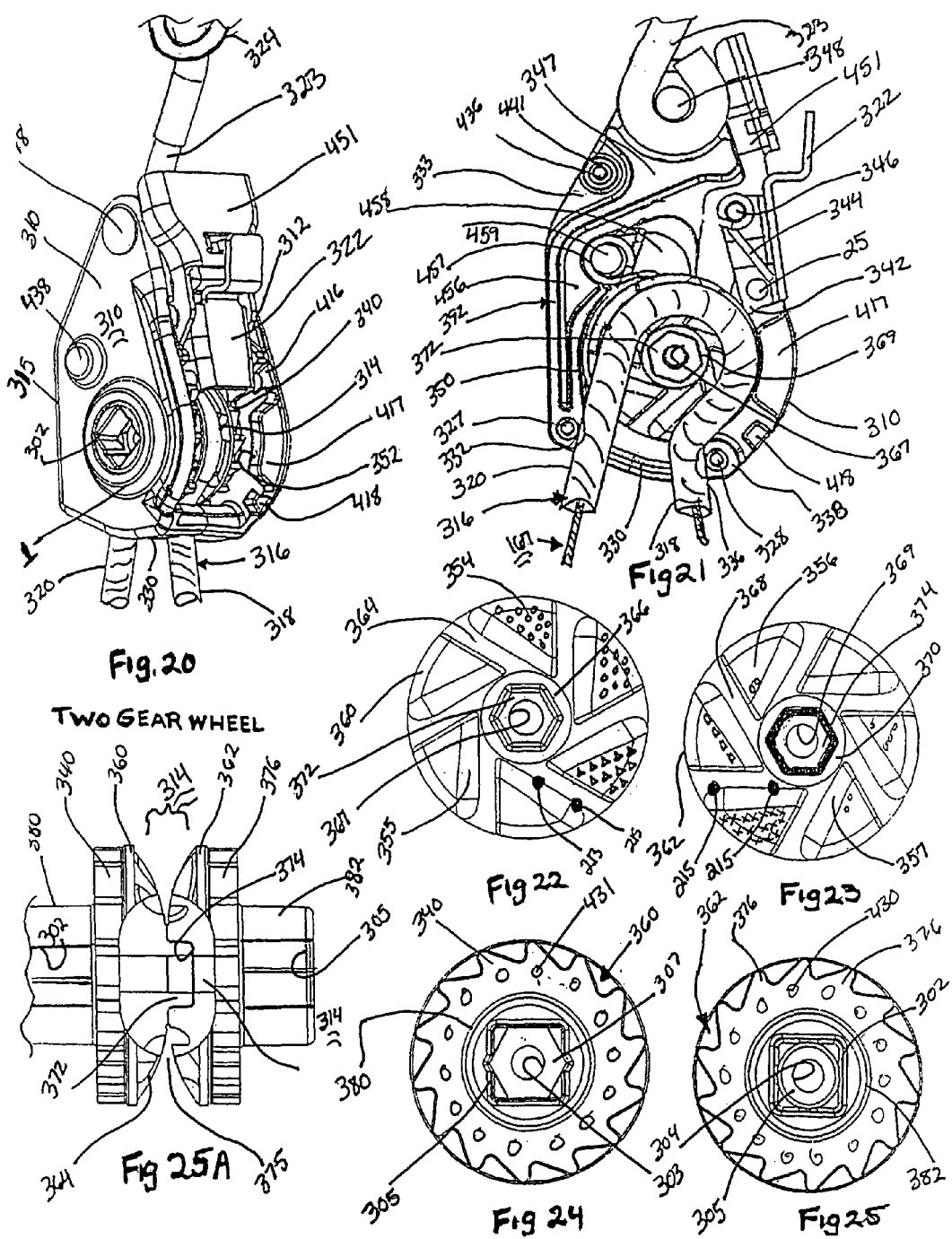

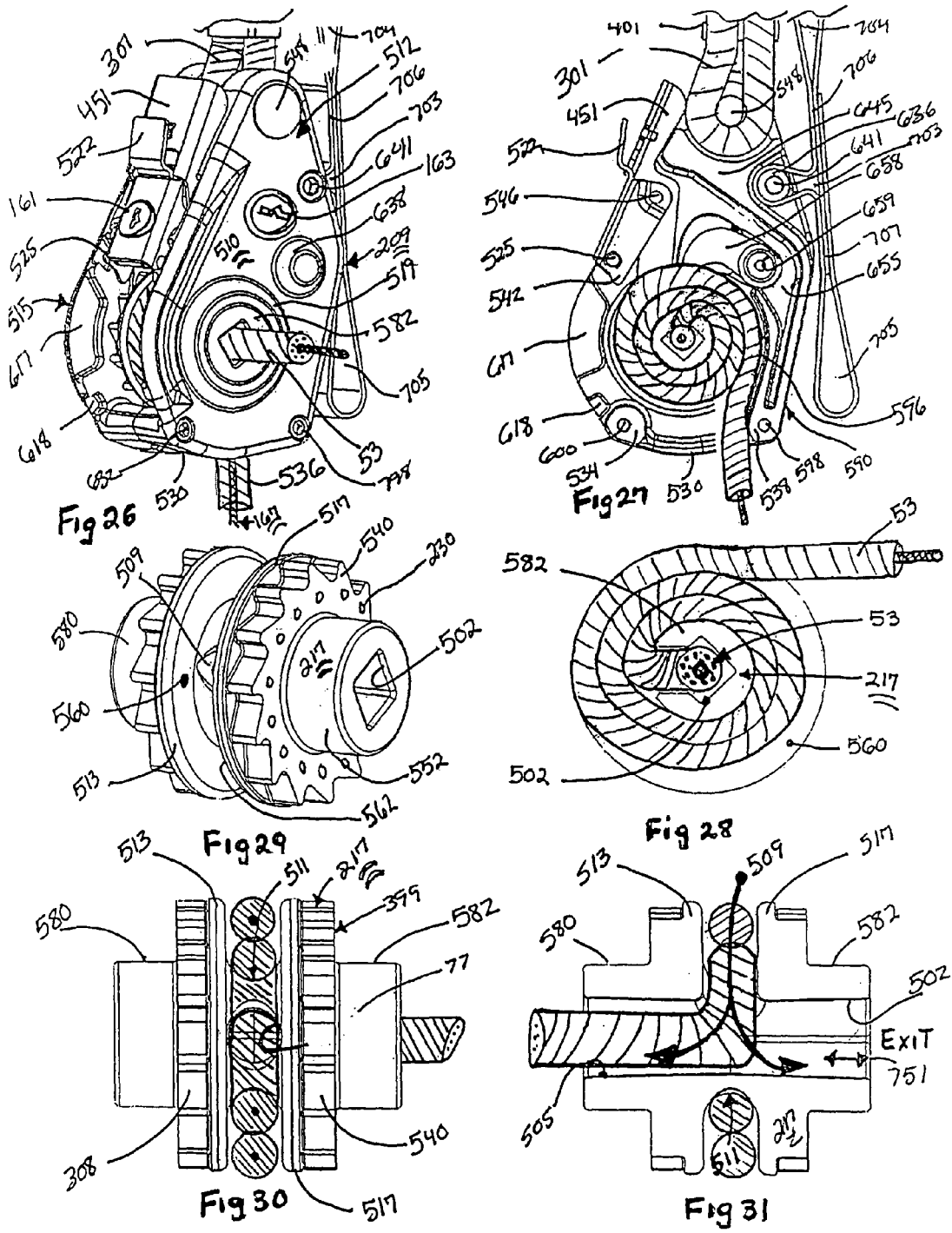

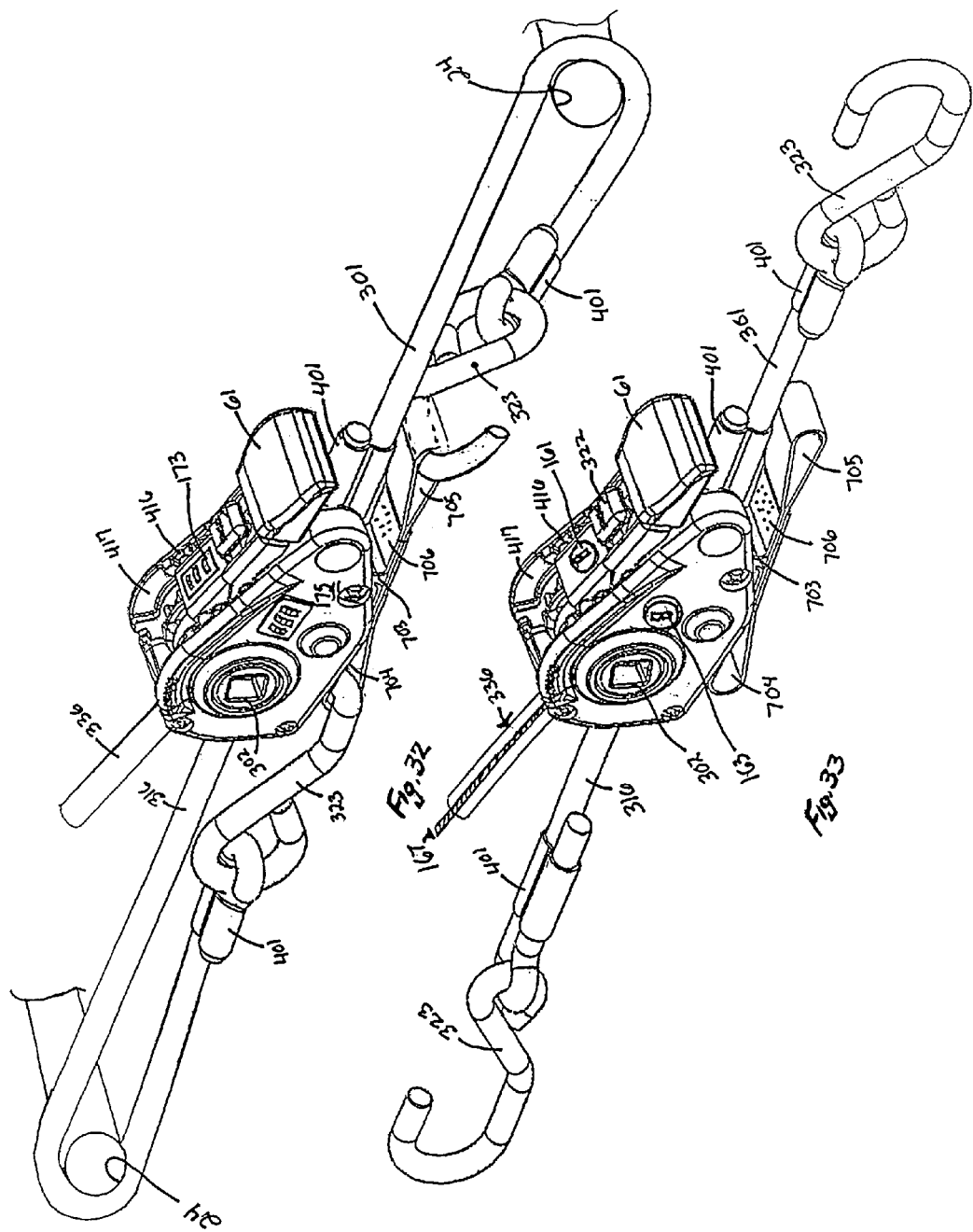

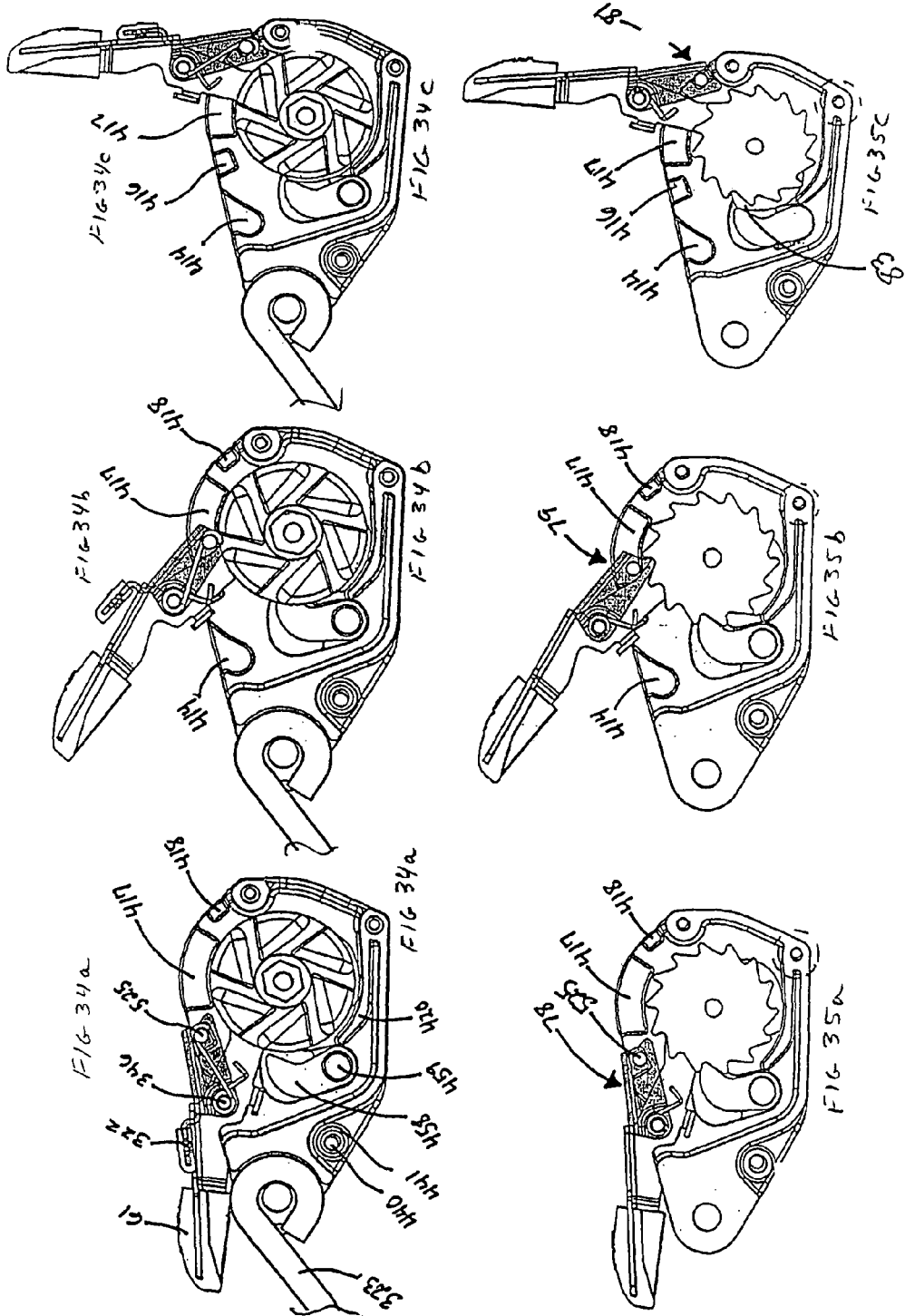

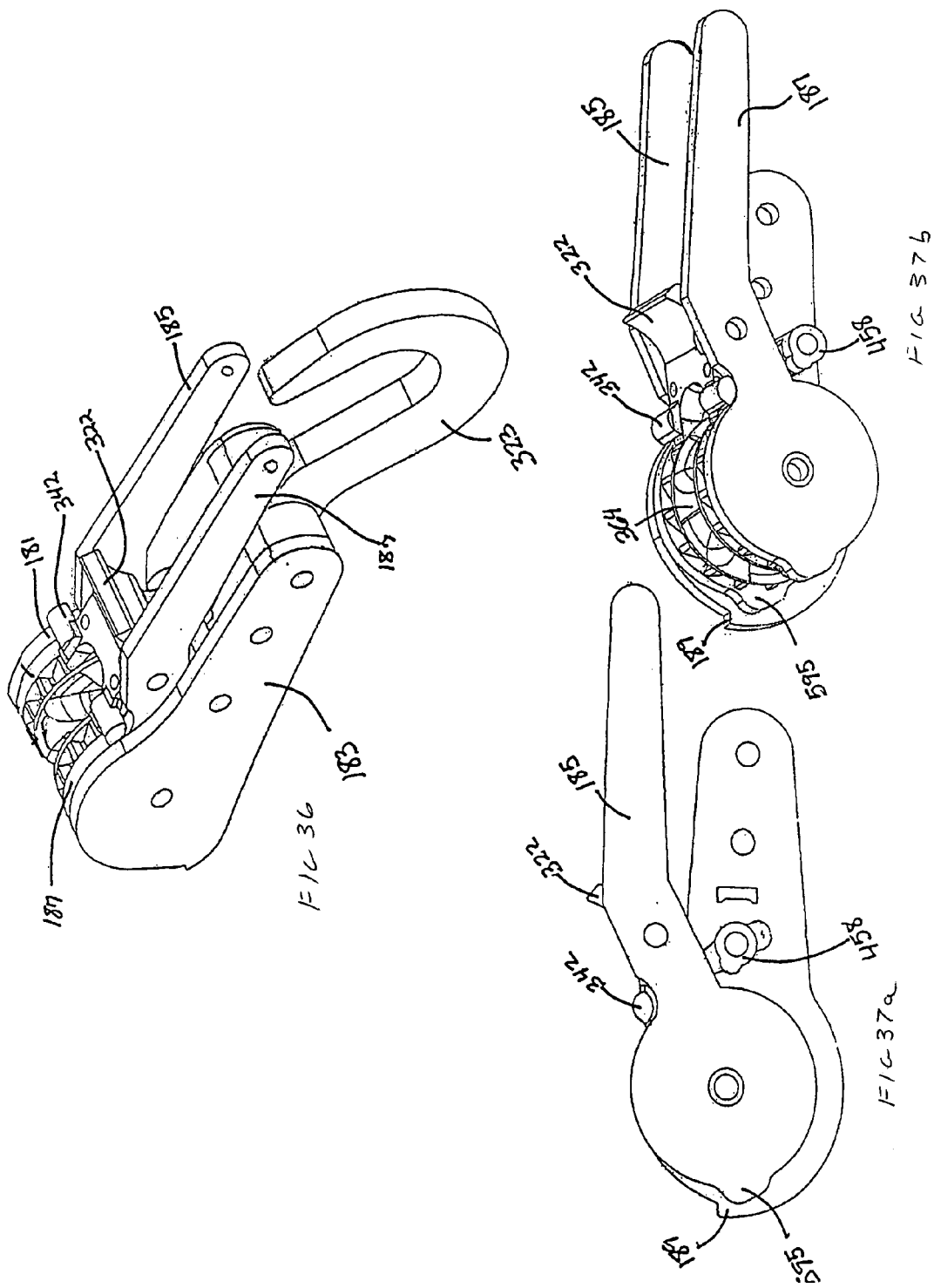

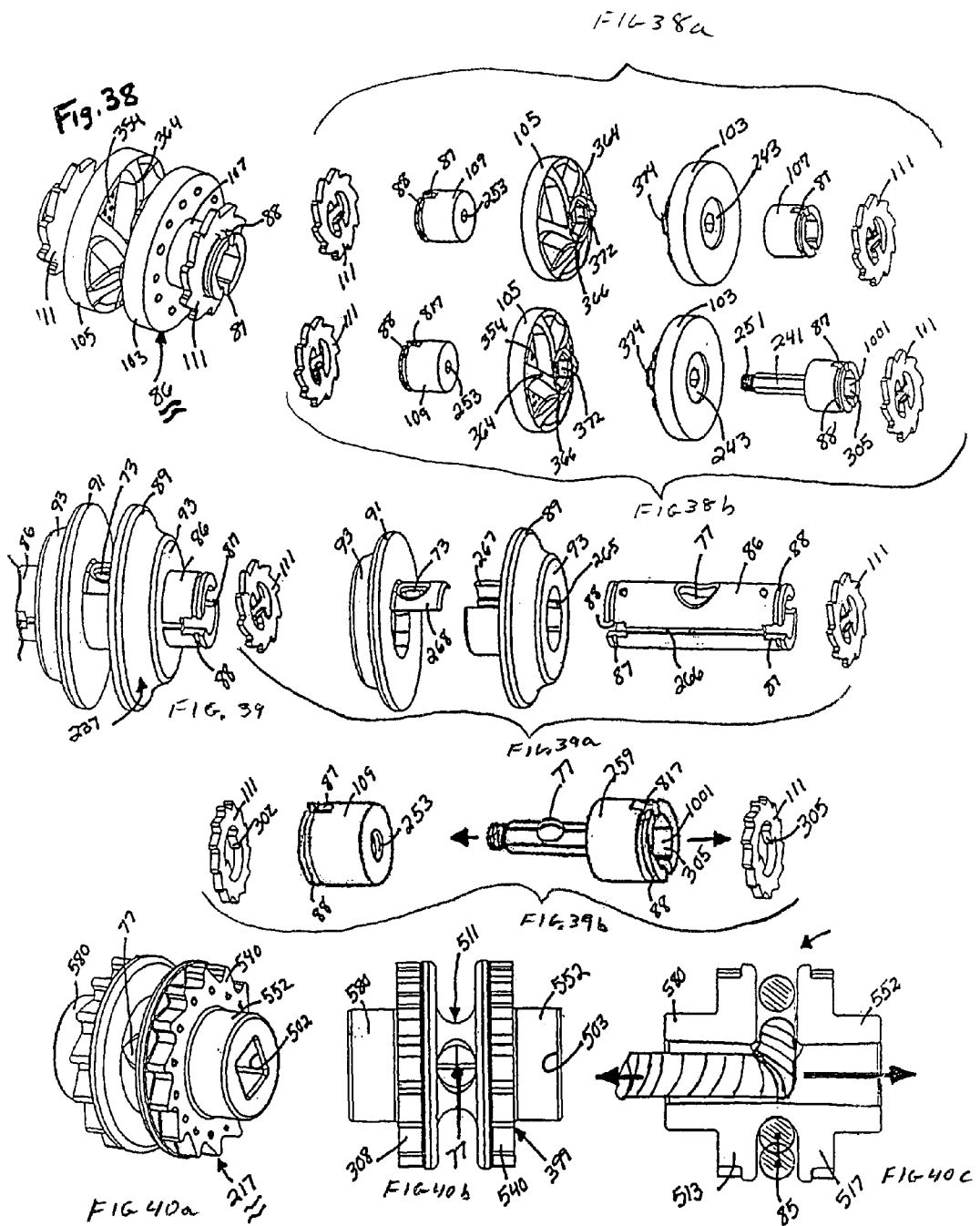

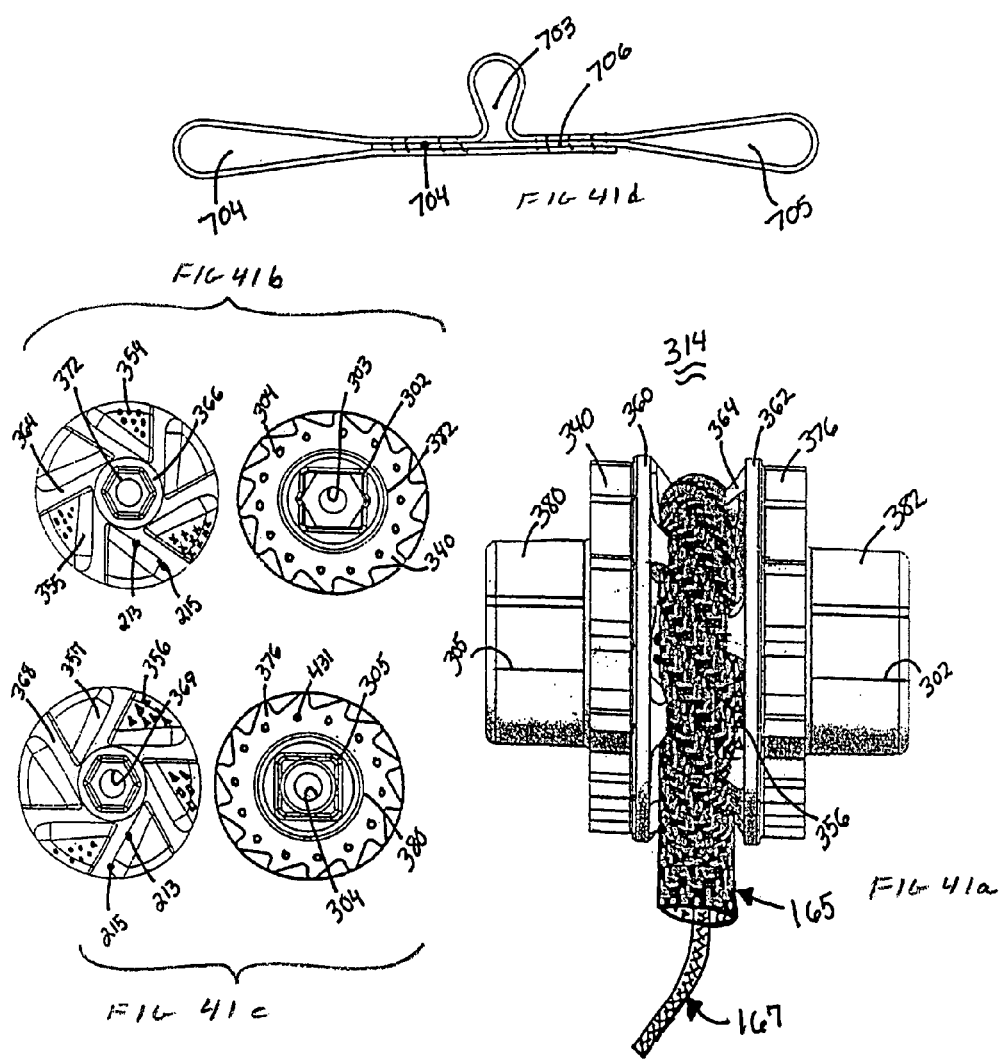

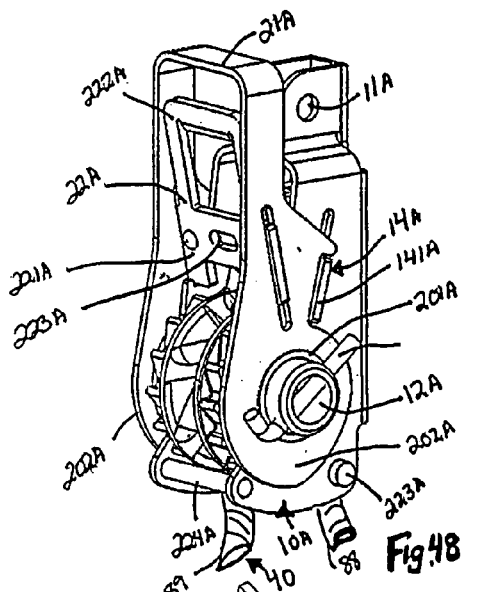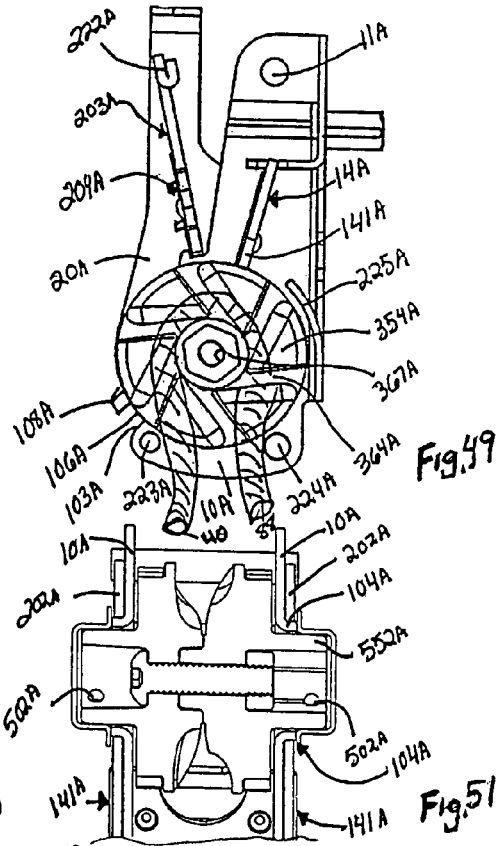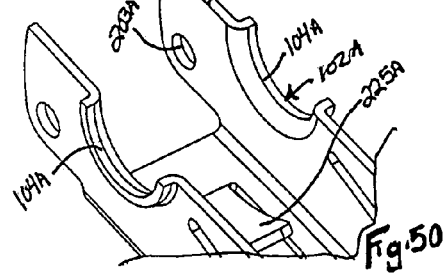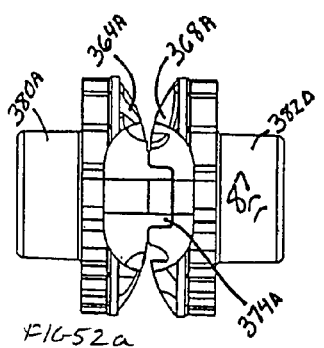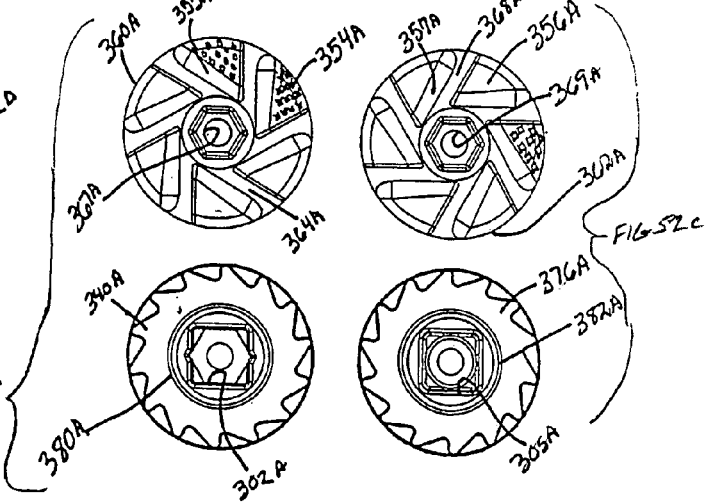

TENSIONING ASSEMBLY

CROSS REFERENCE TO RELATED APPLICATIONS

The present application claims priority to a provisional patent application entitled "TENSIONING ASSEMBLY", describing an invention made by the present inventor, Kenneth Kingery, assigned Ser. No. 61/548,140 and filed Oct. 17, 2011.

BACKGROUND OF THE INVENTION

1. Field of the Invention

The present invention relates generally to a ratchet device for tensioning rope, cords, and cable and more particularly to a handle lever pawl assembly with centrally rotatable body pawls wheels with different configurations incorporating spools with opposing gears equaling the spool rigidity, and anti-theft handle lever and or body pawl including rope or cord with a cable core to prevent simply cutting and removal of ratchet or object being secured.

2. Description of Related Prior Art

Ratchets used with cords as rope, cables and the like, are described in U.S. Pat. No. 6,068,242 incorporated herein by reference and include a spool about which the cord or the like is partially wrapped. Circumferentially located teeth positionally fixed on one side with the spool cooperative with a pawl to permit rotation in the other direction to tighten the cord and to prevent rotation in the other direction to bring about gripping of the cord by the spool when a force is applied to the cord will adequately pull quickly and easily objects in the direction of the ratchets. The pawl usually includes a thumb release to permit selective rotation of the spool in either direction. A hook or other securing member extends from the ratchet to permit anchoring of the ratchet, as shown in U.S. Pat. No. 6,092,791, incorporated herein by reference. Although pulleys or ratchets are well known, it is desired to provide an improved pulley ratchet mechanism for applying greater gripping tension to rope or cord and maintain corrosion resistance for harsh environments such as saline sea water, chemicals heat and cold while incorporating multiple configurations in the spool or spools to add external or internal removable devices to rotate the wheel sheave giving a mechanical advantage to the spool sheave from the larger diameter spool boss journals. The ratchet is configured with internally and externally rotatable handle and centrally located body pawl assemblies including a novel security feature incorporated within a key or combination lock or hook with lock but not limited to a key or combination lock in the bodies or handle locking through rotation of the locks, rotating a pin or lever to lock the handle pawl or body pawls from being able to disengage from a lock position and having a rope in polyester, nylon, dyneema, vectran, polypropylene, or the like incorporating a center core with cable or non-cuttable core for detouring theft by simply cutting the rope or cord and/or releasing the unlocked ratchets. Locking device configurations are unlimited using materials both known and unknown. Known ratchets today have features including external discs to rotate rope or cord within the housing where assembly is required by the consumer, or ratchets having access to only one side to apply tools to rotatable forces. Novel features such as depressing a button inward on the ratchet, moving the pawl lever out of engagement with cooperating teeth of the wheel and facilitating release rather than rotating the pawl lever to release. It is desired to accommodate a ratchet with new and improved technology for three sided access to apply rotational forces to tension the ratchet while incorporating the ability to mechanically release the spool tension, as well as incorporating an anti-theft feature not found in rope or cord ratchets today having built-in means to release the spool while under tension, not commonly found on rope or cord pulley ratchets.

SUMMARY OF THE INVENTION

The present invention relates to ratchets and more particularly, to a ratchet for use with rope or cord and having more rigid construction and corrosion resistant parts. Configured to embody novel features external or internal cavities formed that are extended or recessed into a pair of bosses defining the right and left end walls of the housing bodies that support rope and/or webbing formed into shapes which are considered to be a part within the present scope of the invention certain loops that are fixed to one another to support cord, rope or webbing allowing the wrap around anchor points handle bars tube frames secure objects or the like connecting to hook or rope or webbing with hooks back to formed loops fixed to the opposing housing embodiment which increases mechanical advantage with a pulley like configuration creating a two to one weight capacity with loops connected to ratchet assembly FIG. 11, 204, 205. The ratchet housings embody an external or internal constructed handle lever with depressable pivotal molded or formed pawl with biased teeth or spring loaded detent slidable plate handle lever assembly FIG. 17, 451. A pulley like spool comprised of one solid molded or casted part forming a solid spool with a U shaped valley with larger diameter boss journal axis FIG. 29, 750, the solid embodiment comprising of a U shaped inner hub with variable supporting flanges on and around the based formed tube shaft FIG. 39, 86 or the like in the central part of the center hub consists of one central hole FIG. 31, 751 adjoining the tube shaft from the U valley where rope or cord enters, exposing rope through the tube laterally along the axis allowing the line to enter and be fed out either side of the wheel spool tube boss journals. Pull the loose end of the rope to desired length, then rotate spool, which stacks rope upon itself in the U shaped valley above the center hole, securing the rope in place without damaging rope or cord. The spool journals can be formed to receive internal or external embodiments shaped to accept removable tools to apply the axel with novel features keyway cavities square notch with tapering radius' embodying the floor of the notches FIG. 39, 87 including key ring grooves and/or pins or the like to secure attachments the rotation to the spool circumferentially wrapping rope or cord around the inside of the U shaped valley for tensioning the rope or cord. Yet another assembly can comprise of a pipe tube axel with a centrally configured hole inserting and pressing together a pair of wheel flanged washer like halves with a plurality of gear teeth on opposing sides to form one embodied wheel or spool with deeper U shaped valleys with or without a plurality of external gears on opposing ends. The spool is particularly formed with a larger circumference laterally extending boss journal axes with a hollow interior, creating a tube running inside and throughout the spool which can run horizontally angled from center tube, exiting out the ends of the spool journal axes. Tube journals can be formed with octagon, hexagon, or square cavities or the like configured to accept removable tools internally or externally to apply rotational force of the spool. Once the rope is fed through the varying tube style spools center hole of the valley and exited from the wheel spool and housing (Illustrating an opposing side discharge of rope FIG. 26, 53), then manually grab and pull the slack out of the rope or cord to desired length and rotate the wheel spool to stack and wrap rope upon itself securing two or more revolutions around the inside of the U shaped valley of the spool over the center hole, securing the rope into gripping position without causing damage to rope or cord. It is desired to improve upon various body styles to add more convenient access for operators to apply mechanical rotative advantages from three different sides of the ratchet.

A pair of exemplary embodiments with stamped formed two walls on a floor, creating a solid body housing with opposing members having bosses or studs extending there between one being male, the other being female, to form one member into engagement with aperture cavities in the other member are welded, screwed, riveted, or otherwise permanently secured in place to form the housing of a ratchet. This includes a stamped formed or fabricated unity one piece body housing with two walls on a floor configured with and handle lever assembly with rotatable or spring loaded slidable detent lever pawl plate. The housing is bent and formed creating opposing members or pair of steel plates formed together as one with engaging cavities enjoined to configure a rigid embodiment with flared aperture cavity to support the spool boss journal axels, A stamped sheet of steel plate with a thickness of 0.080 or the like, a flare formed cavity for the spool FIGS. 45 and 51, 104A accommodates a wheel which is rotationally inserted in aperture cavity FIG. 42, 201A of the handle lever FIG. 45, 20A and the aperture cavity of the unity frame FIG. 44, 102A. The arched, flared ridges FIG. 50, 104A of the body cavities for supporting the wheel spool are inserted internally or externally in the body frame. The handle lever cavities are assembled on top of the flared body tabs, reducing friction that would normally be applied to the wheel or hub giving mechanical advantages. The formed body plate flares will be approximately 0.100 to 0.300 wide or the like. Ratchets can be configured in multiple body styles that can be formed of molded, stamped formed steel, or forged of materials including carbon fiber, nylon, plastics, steel, stainless steel, aluminum and the like. The wheel design can be utilized in multiple configurations of body styles to support the tensioning spool or spools.

A spool includes one or more configurations that can be formed to make a solid molded or formed spool or multiple parts to form different assemblies of spools. Cooperating spool teeth are formed on one side or opposing sides of the spool. A spool includes one solid spool or formed pair of spool halves, shafts, tubes, screws, and nuts formed in such a manner to mechanically secure to one another with key and/or keyways, hexed, octagon, or puzzle shafts or tubes forming bossed end journals and square or hexed octagon or puzzle center cavity tubes for axles matching the assembly, pairing male and female threaded or bolts or junctions between or otherwise permanently fixing and forming the spool or spools into one wheel. Spools include circular bosses disposed on opposed sides to serve in the manner of journals. Circular cavities within and partially or completely through the pair of opposed members of the housing receive the spool bosses to rotatably support the spool within the housings. The opposing spool boss journals receive a cavity to form square, hex, octagon or the like internally and/or externally formed and configured or shaped to support structural integrity and accept a removable external tensioning device to apply rotational force in the spool from opposing sides including the handle lever. Cavities are formed with or without corresponding metal formed inserts inserted into a plastic, aluminum, nylon or other soft material on opposite ends of cylindrical boss journals of the spool which will prevent the formed shape from deformation. The formed tube ends when rotated in a counter clockwise direction aid in the release of rope and when rotated in a clockwise direction apply further tension to the rope. Tension can be applied through either formed spool tube end, by rotating the handle lever, or by manually pulling the rope to desired tension. This is not typically found in rope or cord ratchets and allows greater access and convenience to operator of device.

A plurality of non-radially aligned ribs are formed on the surface of each wheel spool of this type and are in an opposed, interleaved relationship to one another. The ribs are tangential and rectangular or round in design and are raised from the base of the spool in a rectangular form with a 90 degree edge of rectangular ridge of rib. The opposing side of the rib slopes and contours down to the surface of the base of the wheel spool. Each wheel base surface contains raised studlike shapes to aid in further gripping of the rope or cord. These gripping shapes FIGS. 22 and 23, 354 and 356 can be square, round, triangular or the like. The opposing spool halves mechanically grip a cord or rope therebetween by forcing it into a serpentine like configuration, and engages rope cord to center of wheel. Rotation of the spool is prevented by interference of the pawl or body pawl and handle lever assembly or slide detent pawl plate trigger with cooperating spool teeth gear, or opposing sides of gears. By applying a pulling force upon the non terminal cord length, rotation of spool is accommodated by the pawl or body pawl triggers upon achieving maximum manual pulling force. The rotatable handle lever assembly can be depressed and pulled backward or the built in spool insert can accommodate and receive a removable tool in the octagon, hex, or square internal or external spool boss axes FIGS. 24 and 25, 302 and 305. A tension can be mechanically applied through rotation of a removable external tool, or built in rotatable handle lever further tensioning the rope, cord or cable.

A pin, shaft, shaped or formed pawl is centrally mounted within opposed corresponding cavities in the pair of opposing housing members to rotatably support a thumb release which consists of a primary and secondary tooth configured to mimic and engage the teeth on the spool. The backside of the secondary pawl gear tooth is molded to form a wedge with the housing and supports both the primary and secondary gear tooth, preventing materials from deformation due to stress under tension.

A molded shaft with one pawl configured to receive the second pawl after spring has been applied and pressed together to form the body pawl. The two pawls upon the shaft will have a broader width than standard ratchets, allowing the excess width to engage the handle cam ridges, rather than a standard pin which can become deformed, creating catastrophic failure. Both body pawl and traditional thumb release have a pair of pawls cooperating with teeth formed on one side or opposing sides of the spool.

A rotatable handle lever and pawl assembly which includes a metal or plastic formed one or two piece handle assembly outside or inside of the body housing and configured in such a way as to surround the boss journals of the spool with a pivotal or rotatable upon a pin thumb lever tab release configured into a solid metal or plastic formed pawl with specifically formed biased teeth cooperating with teeth formed on one side or opposing sides of the spooled gear with a guide pin that passes through the pawl trigger assembly, which allows the pawl to be guided through particularly formed cavities in the opposing housing assemblies FIGS. 21 and 27, 416, 417, and 418 allowing a locking position 416, ratcheting position 417, and release position 418. Locking position is when handle is down and facing the hook, the assembly is locking into the top most recessed cavity formed into the top rim of the opposing body housings through the guide pin of the pawl trigger locking the handle assembly in the down position disengaging the pawl trigger FIGS. 34 and 35, 525 from the spool gears. Grab the handle lever and depress the pawl while rotating the handle upward into second or middle formed recessed cavity FIGS. 34 and 35, 417 in the ratcheting position. Let go of the thumb lever and the guide pin will fall into the formed ratcheting cavity in the opposing housings which allows rotation of the spool in one direction, while body pawl trigger engages the spool's cooperating teeth rotating the spool and tensioning the rope. When releasing of the tension is required, depress the thumb release lever while fully rotating the handle to the back or bottom third formed release cavity FIGS. 34 and 35, 418 of housing. Release the thumb lever and allow the guide pin to engage the formed cavity in the opposing housings for release position. This disengages the handle lever from the cooperating spool teeth while simultaneously forcing the body pawl assembly out of ratcheting position from the cooperating spool teeth through timed arched edged contouring cams on both sides of the bottom of the handle lever plates engaging and forcing flat body and pawl plates or rotatable body pawl assembly outwardly extended from the boss journals of the spool and allows the spool to rotate freely in a counter clockwise rotation to release the tension on the rope and spool. The handle lever assembly is attached to the outside or inside of the housing embodiments and is circularly rotated around the boss journals of the spool and configured to engage the pawl with cooperating spool teeth to permit rotation of the spool in a clockwise direction and pivotally disengage from cooperating spool teeth in a counter clockwise direction.

A related handle lever and body housing configuration can be stamped and formed from a metal sheet or a solid one piece with two walls on a housing floor forming the housing, or a stamped lever plate to become a handle assembly, or a multiple plate piece, housing plates, floor plate, and handle assembly to rotate about the boss journal axes internally and externally with assembled clips that are welded or pinned. Instead of using a pivotal thumb lever release, it uses a flat detent body pawl configured in such a way that slides through a spring loaded slot in the opposing housing bodies or opposing handle lever plates that engage the cooperating spool teeth through cavity slots in the formed metal body housing and the handle lever assembly. The handle lever will have certain raised arched cams on both sides of the handle lever around the wheel bosses to engage the body pawl plate and through the body rotation is raised arched ribs to cam the handle and body pawl plate disengaging both handle and body pawl plate from the cooperating teeth of the spool. The handle rotation allows engagement and disengagement of the spool. Rotating clockwise to tension, and counter clockwise to disengage both handle and body slide plates, which allows the spool to rotate freely.

A rod extending from one member of the opposed pair or formed housing plate members and mechanically secured, welded, riveted, or otherwise permanently secured in place supports a hook, rope, or webbing with a hook for suspending or securing the ratchet.

All ratchets previously described can be fitted with a combination style lock FIG. 32, 175 or key style lock FIG. 33, 163 in the handle, body housing, and/or hooks (not shown) of the ratchet. This feature prevents the ratchet and/or hooks from being able to release without first disabling the locking mechanism by rotating the key or dialing the combination in the lever or housing body, releasing the lever or pin from the body pawl, handle pawl, or opposing bodies, allowing handle to rotate and release, which adds an anti-theft quality to the ratchet itself as well as any objects being secured by the ratchet. The rope or cord can be substituted for a rope with a metal cable core or other core that cannot be easily cut with a knife or other tools. The hooks, ratchet lock, and rope incorporate materials known and not yet known. This adds further strength and security to the ratchet's anti-theft components not typically found in other rope or cord ratchets.

By forming or molding the spool and the ratchet formed into the desired shapes from carbon fiber, high strength composites, plastics, synthetics, aluminum, stainless steel, or other non-corrosive materials, deterioration or corrosion will be prevented.

It is therefore the primary object of the present invention to provide a non-corrosive ratchet usable in harsh environments to add longevity to the ratchet.

A further object of the present invention is to provide a spool or spools for a ratchet. The spool bosses have a larger diameter opposed supportive boss journals to reduce the load density while simultaneously giving the ability to rotate the spool through insertion of a removable tool into a formed cavity or inserted cavity shaped to accept a removable tool without deforming the spool boss journal. Rotate spool in the housing in a clockwise direction to tension, or in a counter clockwise direction to release.

Yet another object of the present invention is to provide a solid formed, molded or machined one piece wheel and/or pair of wheels keyed and keywayed through a tube mechanically threaded with male and female sides FIGS. 39, 127 and 125: the male side end threaded octagon, hex, or square shaped with hollow tube throughout with end cap larger boss journals to support load density on opposing ends incorporating internal or external cavities or inserts to accept or receive removable tools for rotation. The female side end is internally threaded to receive the male threaded shaft with configured shapes to receive external tools on end of cap. The male and female boss journals are slotted in a rectangular notch shape with radius sidewalls meeting end cap floors to accept stamped formed gear wheels with a keyway not to enclose the ends of the tube shaft axle that can be configured to accept a removable tool. This keyway bolt can mechanically assemble the two halves of the spool, or be pressed together aligning the pair of wheels as one wheel spool.

Another object of the present invention is to provide a pulley like spool with a side rope discharge comprised of one solid formed part or pipe tube configured to receive a pair of wheel halves with deeper smooth, textured, or ribbed U shaped valleys with or without external gears on opposing side ends that is particularly formed with a larger circumference, laterally extending boss journals with a hollow interior, creating a tube running throughout the spool which can run horizontally or at an angle from center of hub, exiting out spool journal ends. Journals can be formed internally or externally with octagon, hexagon, or square cavities configured to accept removable tools to apply rotational force of the wheel spool. Between the U shaped valleys is a centrally located hole which connects to the hollow tube bosses allowing rope to be fed through the center hole in the bottom of the U shaped valleys and can be manually pushed to exit in either direction of the wheel spool tube. Once the rope is fed through the center hole of the valley or tube and discharged from the wheel spool and housing, rope can be manually pulled to remove the slack and reach desired length and then rotate the wheel spool to stack rope upon itself in two or more revolutions, covering the central hole. The tension on the rope prevents any of the rope layers from slipping. The rope is bent at a 90 degree angle at entrance to tube, which prevents slippage and doesn't cause damage to rope or cord which gives the spool greater capacities.

A still further object of the invention is to provide a formed, fabricated, or molded handle that is a one or two piece handle lever tensioning release assembly with or without rubberized padding for applying tension to rope or cord. Embodied centrally is a rotatable pin and spring loaded pawl trigger to engage rotation of wheel spool on one or both sides of the cooperating spool gear teeth. The handle assembly primarily rotating upon the wheel boss journals axes embodying an arched, ridged, rib outwardly and around the boss' journal forming a pair of ridged cams on both sides of the handle plate levers extending to engage the internal body pawl assembly or spring loaded slide handle body plate configured to be forced upward and away, which disengages the body pawl or slide handle and body plate pawls from cooperating spool gear teeth.

And yet another object of the present invention is to provide a rope or webbing configured in such a way as to form a single loop or multiple loops, with variable lengths that attach to opposing raised or recessed cavities, designed to hold the rope or webbing loop into the opposing housings through a bolt pin or rivet. The loops can be permanently attached or in such a manner to be a semi-permanent lockway, bolt, or pin that is removable if webbing or rope is desired to be removed or replaced.

In yet another object of the present invention is to provide a combination style lock or key style lock in the handle, body housing, and hooks of the ratchet. This feature prevents the ratchet and/or hooks from being able to release without first disabling the locking mechanism, by rotating the key or dialing the combination in the lever or housing body, releasing the lever or pin from the body pawl, handle pawl, or opposing bodies, allowing handle to rotate and release, which adds an anti-theft quality to the ratchet itself as well as any objects being secured by the ratchet. The rope or cord can be substituted for a rope with a metal cable core or other core that cannot be easily cut with a knife or other tools. The hooks, ratchet lock, and rope incorporate materials known and not yet known. This adds further strength and security to the ratchet's anti-theft components not typically found in other rope or cord ratchets.

A still further object of the present invention is to form a one piece body with two sidewalls on a floor featuring cut, curled, tabbed, or flared cavities extending inwardly or outwardly to accept handle lever plates over the flared cavities, reducing friction from spool boss axes traditionally found in ratchets.

In yet another object of the present invention is to provide a handle lever assembly that can be formed with one solid stamped piece or two opposing side plates forming a handle assembly with bolts, screws, or rivets for attachment with a pivotable pawl trigger and/or a slideable handle pawl plate. The handle can be assembled on the inside or outside of the body housing.

In still another object of the present invention is to have stamped, cut out, or formed gear wheels that are configured in the center of the wheel shapes to receive removable tools to apply rotational force which gives it a mechanical advantage.

Another object of the present invention is to provide multiple styles of wheel spools including the traditional style spool with different ways of assembling the two halves through shaped bolts with boss ends with notches that can receive the stamped, formed gear wheels. The spools can be with or without gears molded on the outside of the base. Another wheel spool style includes a solid, U shaped valley with supporting flanges with one center hole to allow for rope to pass through the hollow tube axis with large diameter boss journals where the rope can exit out either side of the spool and housing. A third style includes pipe tube with cut notches on opposing ends of the tube with a keyring groove or cavity for keeper pin with two supporting washer flanges incorporating sleeves and tabs that slide onto the tube exposing the center hole of the tube. Opposite ends are notched to receive stamped, formed gear wheels.

A further object of the present invention is to provide a rope or webbing formed to extend hook from top of the pair of opposing housing bodies. The rope or webbing can be configured as to form loops within itself, sewn, molded, aluminum ferrules, or other means to permanently attach to one another to hold a hook, hooks, loops, or the like attached with a pin to the top of the opposing housings.

Exemplary embodiments will now be described with references to the accompanying figures, wherein like reference numbers refer to like elements throughout. The terminology used in the description presented herein is not intended to be interpreted in any limited or restrictive manner simply because it is being utilized in conjunction with a detailed description of certain embodiments. Furthermore, various embodiments (whether or not specifically described herein) may include novel features, no single one of which is solely responsible for its desirable attributes or which is essential to practicing any of the embodiments herein described.

These and other objects of the present invention will become apparent to those skilled in the art as the description thereof proceeds.

BRIEF DESCRIPTION OF THE DRAWINGS

The present invention will be described with greater specificity and clarity with reference to the following drawings, in which:

FIG. 1 is a perspective view of a ratchet;

FIG. 2 is a cross-sectional view taken along lines 2-2, as shown in FIG. 1;

FIGS. 2a and 2b illustrate the pawl;

FIG. 3 is an exploded view of the spool rotatably mounted within the ratchet;

FIG. 4 is an end view of the spool;

FIG. 5 is another end view of the spool;

FIG. 6 is a partial cross-sectional view of the spool;

FIG. 6A is a side view of the spool;

FIG. 7 is a plan view of the interior of one of the members forming the housing of the ratchet;

FIG. 8 is a plan view of the other member forming the housing of the ratchet;

FIG. 9 is an exploded side view of the members forming the housing of the ratchet;

FIG. 10 is a perspective view of an improved ratchet;

FIG. 11 is a cross-sectional view taken along lines 11-11, as shown in FIG. 10;

FIGS. 11a and 11b illustrate the pawl;

FIG. 12 is a cross-sectional view of a spool;

FIG. 13 is a view of the inside surface of one of the spool wheels;

FIG. 14 is a view of the inside surface of another of the spool wheels;

FIG. 15 is a side view of one side of the spool;

FIG. 16 is a side view of another side of the spool;

FIG. 17 is an exploded view;

FIG. 18 is a partial view of the handle and pawl assembly;

FIG. 19 is an exploded view of handle and pawl assembly;

FIG. 20 is a perspective view of another embodiment of a ratchet;

FIG. 21 is a cross-sectional view;

FIG. 22 is a view of the interior surface of one of the spool wheels;

FIG. 23 is a view of the interior surface of another of the spool wheels;

FIG. 24 is one side view of the spool;

FIG. 25 is another side view of the spool;

FIG. 25A is a partial cross-sectional view of a spool;

FIG. 26 is a perspective view of an improved ratchet;

FIG. 27 is a cross-sectional view of the ratchet shown in FIG. 26 showing rope stacking upon itself in the U shaped valley and exiting through a hole to the outside boss journals;

FIG. 28 is a view of one half of the spool with rope secured into the center hole of U shaped valley and wound upon itself in tension;

FIG. 29 is an isometric view of a spool;

FIG. 30 is a front elevational view of a spool with layers of a rope and exiting out side of the spool boss journal;

FIG. 31 is a partial elevational view of a spool with layers of rope and exiting out side of the spool boss journal;

FIG. 32 is an isometric view of a ratchet with rope wrapped around anchors and secured through hooks attached to webbing loops extending from the housing;

FIG. 33 is an isometric view of a ratchet with extending rope;

FIGS. 34a, 34b and 34c illustrate three functional configurations of the interior of the ratchet;

FIGS. 35a, 35b and 35c illustrate three functional configurations of another interior view of the ratchet;

FIG. 36 is an isometric view of a ratchet containing two body plates, two handle plates, a spool, body pawl, and handle pawl;

FIGS. 37a and 37b illustrate parts of the ratchet shown in FIG. 36;

FIG. 38 illustrates a spool and FIGS. 38a and 38b are exploded views showing two combinations of spools wherein one utilizes a screw and nut, and the other utilizes a formed, shaped, shaft with boss ends;

FIG. 39 is an isometric view of a spool having a hollow shaft;

FIG. 39a is an exploded view of FIG. 39;

FIG. 39b is an exploded view of an alternative shaft;

FIG. 40a is an isometric view of a side discharge spool;

FIG. 40b is a side view of the spool shown in FIG. 40a;

FIG. 40c is a partial cross-sectional view of the spool shown in FIG. 40a;

FIG. 41a illustrates a cord wrapped about a spool;

FIG. 41b illustrates the interior and exterior surfaces of one of the wheels of the spool shown in FIG. 41a;

FIG. 41c illustrates the interior and exterior surfaces of the other wheel of the spool shown in FIG. 41a;

FIG. 41d is a side view of a looped strap attachable to the housing of a ratchet;

FIG. 47a is an isometric view of the spool shown in FIG. 45;

FIG. 47b is a side view of the spool shown in FIG. 47a;

FIG. 48 is an isometric view of an improved ratchet;

FIG. 49 is a cross-sectional view of the ratchet shown in FIG. 48;

FIG. 50 is a partial view of the frame for supporting the bosses of the spool;

FIG. 51 is a partial cross-sectional view of the spool mounted in the frame;

FIG. 52a is a side view of the spool shown in FIG. 51;

FIG. 52b illustrates the interior and exterior surfaces of one of the wheels shown in FIG. 52a;

FIG. 52c illustrates the interior and exterior surfaces of the other of the wheels shown in FIG. 52a;

FIG. 53b is an isometric view of the ratchet shown in FIG. 53a;

DESCRIPTION OF THE PREFERRED EMBODIMENT

Embodiment 1

Figure 42:
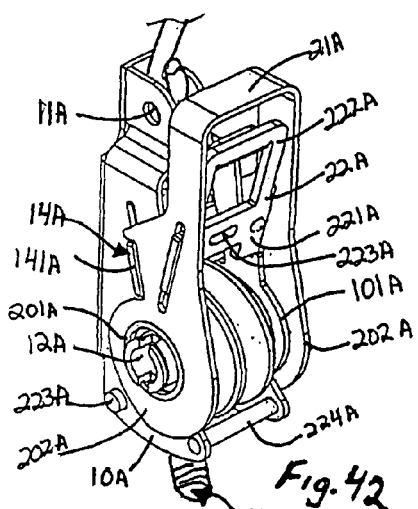
FIG. 42 is an isometric view of a further embodiment of a ratchet.
Figure 43:
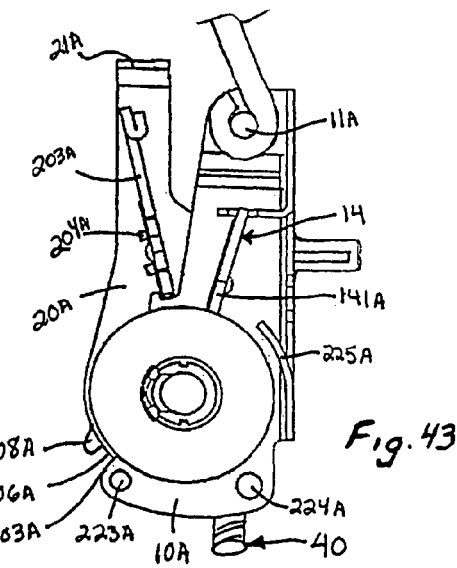
FIG. 43 is an interior view of the ratchet shown in FIG. 42.
Figure 44:
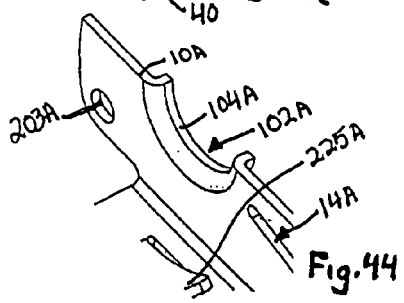
FIG. 44 is a partial view of the frame supporting the spool of the ratchet shown in FIG. 42.
Figure 45:
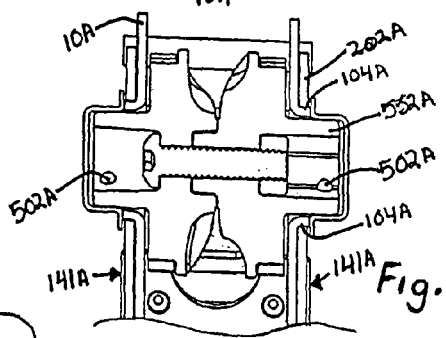
FIG. 45 is a partial cross-sectional view of the spool mounted in the ratchet shown in FIG. 42.

A ratchet 10, illustrated in FIG. 1, includes a housing 12 of moldable plastic or metal materials, which material is of sufficient robustness to withstand the loads imposed. Material suitable may include nylon, delron, carbon fiber, stainless steel, steel, aluminum or any of other known or to be developed molded plastic, molded metal, and rigid steel materials having high strength characteristics. A spool 14, rotatably mounted within housing 12, supports a cord 16 partially wrapped thereabout and having ends 18, 20 extending from the bottom of the ratchet. A thumb release 22 includes a pawl or assemblies interferingly engaging with spool teeth formed as part of spool 14 or opposing spool pairs to prevent rotation of the spool in one direction and yet accommodate rotation of the spool in the other direction. A hook 23, extends from the upper end of housing 12 to secure the ratchet as represented by ring 24. As noted from FIG. 1, the plan form of ratchet 10 is essentially variable tear drop shaped to provide a lateral balance from the point of suspension of the ratchet.

Further details attendant the structure and operation of the ratchet will be the housing 12, 15 has a first housing body 12 for a removable attachment to a second housing body 15 by connectors 97 such as fasteners, screws, or the like received within corresponding orifice cavities 26, 27, 28, 31 formed in each of the first housing body and the second housing body described with respect to FIG. 2. The bottom of ratchet 12 includes a slotted opening 30, defined by the terminal end 32 of end wall 34 and terminal end 36 of end wall 38. Cord 16 is partially wrapped about spool 14 with lengths 18 and 20 exiting through opening 30. Preferably, the length of opening 30, defined by terminal ends 32, 36 is less than the diameter of the part of the cord looped about spool 14 to urge the cord radially inwardly about the spools upon the application of pulling forces upon lengths 18 and 20 to mechanically engage the cord with the spool and prevent slippage therebetween. The spool includes a plurality of teeth 40 selectively engagable by pawl 42 of thumb release 22 to prevent rotation of spool 14 in one direction; counter clockwise as illustrated in FIG. 2. A coil spring 44 biases pawl 42, 43 of thumb release 22 while wedging the pawl into housing 47 preventing downward rotation and into engagement with the two biased teeth. Upon lifting of the thumb release in the counter clockwise direction as shown in FIG. 2, the pawl is disengaged from the cooperating teeth 40 and spool 14 is free to rotate in either direction. A pin 46, mounted within housing 12, and in wall support 47 pivotally supports thumb release 22 and biased pawls 42, 43. A rod 48, which may be formed as part of the housing 12, supports hook 23 or rope or webbing extension 301 from housing of ratchet to secure objects 24.

To secure cord 16 with ratchet 10, the terminal end of the cord is inserted through opening 30 into the left side (with reference to FIG. 2) of spool 14. Curved interior wall 50, with cavity throughout housing 12 forming in part a cavity within which the spool is housed, will guide the terminal end of the cord about the spool. Insertion of the cord will be enhanced by manually rotating the spool in the clockwise direction through opening 30 of the housing, or by mechanically manipulating the spool 2, 5, 14 with a removable tool (not shown) through formed cavities or metal inserts on opposing sides of spool journals 80, 82. The terminal end of the cord is brought out from within the housing through opening 30. The resulting engagement is illustrated in FIG. 2.

Referring jointly to FIGS. 3, 4, 5, and 6, details attendant spool 75 will be described. The spool includes wheels 62 and 60. Wheel 62 includes a plurality of ribs 64 extending outwardly from hub 66. Similar ribs 68 extend outwardly from hub 70 in wheel 62. Ribs 64, 68 may be rectangular, forming the primary rib from a square edge surface on the ridge of the rib 55, 57 preferably includes angled sides contouring having a greater degree of incline or slope along the outermost flared portion of the rib ridge with a degree of incline decreasing along the length of the rib ridge to the inner portion of the spool base surface of the wheel 54, 56 illustrating a raised pyramid, square, hex, round or the like texture establishing from a smooth surface to a gripping like surface, giving the textured spool base surface a mechanical advantage and gripping cord or rope as illustrated in FIG. 3. In either event, an imaginary extension or projection of the interior end of either type of rib would not extend through the axes of rotation, or the center, of the respective wheel; that is, none of the ribs, nor any portion thereof, are radial to the axis of rotation of the spool. Upon assembly of wheels 60, 62 with one another, it is preferable that the ribs of one wheel be offset or interleaved with the ribs of the other wheel to force the cord disposed there between into a serpentine configuration as illustrated in FIG. 41 to increase the mechanical interference between the cord and the spool, and to prevent slippage there between without unduly squeezing the cord and causing damage to some of the strands of the cord. To ensure proper alignment of the wheels about their common axes of rotation to interleave the ribs, a key 72 extends from hub 66 of wheel 60 and a mating keyway 74 for receiving key 72 is disposed in hub 70 of wheel 62. As illustrated, key 72 is hexagonal, octagonal, or puzzle shaped in cross-section and keyway 74 is a hexagonal, octagonal, or puzzle shaped cavity. Passageway 67 extending through the center of wheel 75 is formed primarily to accept screws, lugs, or shafts, formed in octagon, hexagon, square, or the like shapes to pass through passageway 69, and extends through the center of wheel 62 for the same purpose. After mating of key 72 with keyway 74, the respective ribs of wheels 60 and 62 will be in opposed interleaved relationship, as illustrated in FIG. 6. The two wheels may be permanently secured to one another by sonic welding, metal molded, casted, screw and nuts, or threaded hex, square, or octagonal shafts with boss journal end caps 80, 82. End caps will have cavities formed with a hex, octagon, or square internal or external molded or inserted configuration 2, 5 or the like. After such attachment, the boss 82 extending laterally from wheel tooth 62, which bosses serve in the manner of journals within housing 12 by a boss 80 extending laterally from wheel 60 configured in such a way as to accept and receive formed shapes or metal formed inserts 2, 5 into the circular boss journals. Insert can be formed internally in a cavity or externally to accept removable tools to apply rotational forces on opposing cylindrical boss journals 80, 82.

Wheels form or become a one piece unit that is not intended to be disassembled. Wheel 62 includes a disk-like element having a plurality of teeth 40 disposed at its perimeter and a plurality of pin cavities 119 extending from a boss 80 to support the peripherally located teeth. Spool 14 is rotatably mounted within housing 12 by a boss 80 extending laterally from wheel 60 and by a boss 82 extending laterally from wheel tooth 62, which bosses serve in the manner of journals. Each of these bosses nests within corresponding circular cavities through the formed housing 12. Cavity 84, for supporting boss 82, is illustrated in FIG. 2.

Embodiment 2

A ratchet 179, illustrated in FIG. 10, includes a housing 181 of moldable plastic or metal materials, which material is of sufficient robustness to withstand the loads imposed. Material suitable may include nylon, delron, carbon fiber, stainless steel, steel, aluminum or any of other known or to be developed molded plastic, molded metal, and rigid steel materials having high strength characteristics. A spool 164, rotatably mounted within housing 181, supports a cord 166 partially wrapped thereabout and having ends 168, 170 extending from the bottom of the ratchet. A thumb release 172 includes a pawl or assemblies interferingly engaging with spool teeth formed as part of spool 164 or opposing spool pairs to prevent rotation of the spool in one direction and yet accommodate rotation of the spool in the other direction. A hook 174, extends from the upper end of housing 181 to secure the ratchet as represented by ring 176. As noted from FIG. 10, the plan form of ratchet 179 is essentially variable tear drop shaped to provide a lateral balance from the point of suspension of the ratchet. Further details attendant the structure and operation of the ratchet will be the housing has a first housing body 181 for a removable attachment to a second housing body 183 by connectors 255, 256, 257, 258 such as fasteners, screws, or the like received within corresponding orifice cavities formed in each of the first housing body and the second housing body described with respect to FIG. 10, 11. The bottom of ratchet 181 includes a slotted opening 180, defined by the terminal end 182 of end wall 184 and terminal end 186 of end wall 188. Cord 166 is partially wrapped about spool 164 with lengths 168, 170 exiting through opening 180. Preferably, the length of opening 180, defined by terminal ends 182, 186 is less than the diameter of the part of the cord looped about spool 164 to urge the cord radially inwardly about the spools upon the application of pulling forces upon lengths 168, 170 to mechanically engage the cord with the spool and prevent slippage there between. The spool includes a plurality of teeth 190 selectively engagable by pawl 192 of thumb release 172 to prevent rotation of spool 164 in one direction; counter clockwise as illustrated in FIG. 11. A coil spring 44 biases pawl 192, 193 of thumb release 172 while wedging the pawl into housing 146 preventing downward rotation and into engagement with the two biased teeth. Upon lifting of the thumb release in the counter clockwise direction as shown in FIG. 11, the pawl is disengaged from the cooperating teeth 190 and spool 164 is free to rotate in either direction. A pin 198, mounted within housing 181, and in wall support 191 pivotally supports thumb release 172 and biased pawls 192, 193. A rod 196, which may be formed as part of the housing 181, supports hook 174 or rope or webbing extension from housing of ratchet.

To secure cord 166 with ratchet 181, the terminal end of the cord is inserted through opening 180 into the left side (with reference to FIG. 11) of spool 164. Curved interior wall 200, with a formed window cavity 201 throughout housing within which the spool is housed, will guide the terminal end of the cord about the spool. Insertion of the cord will be enhanced by manually or mechanically rotating the spool through the internal or external formed or inserted octagon, hex, or square boss journal cavities 221, 223 which receive a removable external tool and rotate in a clockwise direction. The terminal end of the cord is brought out from within the housing through opening 202. The resulting engagement is illustrated in FIG. 11. Referring jointly to FIGS. 13, 14, 15, and 16, details attendant spool 164 will be described. The spool includes wheels 210, 212. Wheel 210 includes a plurality of ribs 214 extending outwardly from hub 216. Similar ribs 218 extend outwardly from hub 220 in wheel 212. Ribs 214, 218 may form the primary rib from a 90 degree edge of the rectangular rib configured on the ridge of the rib 214, 218 preferably includes angled sides contouring having a greater degree of incline or slope along the outermost flared portion of the rib ridge with a degree of incline decreasing along the length of the rib ridge to the inner portion of the spool base surface of wheel 164 illustrating a raised pyramid, square, hex or the like texture establishing from a smooth surface to a gripping like surface, giving the textured spool base surface a mechanical advantage and gripping cord or rope as illustrated in FIG. 11. In either event, an imaginary extension or projection of the interior end of either type of rib would not extend through the axes of rotation, or the center, of the respective wheel; that is, none of the ribs, nor any portion thereof, are radial to the axis of rotation of the spool. Upon assembly of wheels 210, 212 with one another, it is preferable that the ribs of one wheel be offset or interleaved with the ribs of the other wheel to force the cord disposed there between into a serpentine configuration as illustrated in FIG. 41 to increase the mechanical interference between the cord and the spool and to prevent slippage there between without unduly squeezing the cord and causing damage to some of the strands of the cord. To ensure proper alignment of the wheels about their common axes of rotation to interleave the ribs, a key 222 extends from hub 216 of wheel 210 and a mating keyway 224 for receiving key 222 is disposed in hub 220 of wheel 212. As illustrated, key 222 is hexagonal, octagonal or puzzle shaped in cross-section and keyway 224 is a hexagonal, octagonal, or puzzle shaped cavity. Passageway 236 extending through the center of wheel 164 is formed primarily to accept screws, lugs, or shafts, that are formed in octagon, hexagon, square, or the like shapes to pass through passageway 228 extends through the center of wheel 212 for the same purpose. After mating of key 222 with keyway 224, the respective ribs of wheels 210, 212 will be in opposed interleaved relationship, as illustrated in FIG. 12. The two wheels may be permanently secured to one another by sonic welding, metal molded, casted, or threaded hex, or octagonal shafts with boss journal end caps 232, 234. End caps will have cavities formed with a hex, octagon, or square internal or external molded or inserted configuration 221, 223. After such attachment, the boss 232, 234 extending laterally from wheel tooth 210, which bosses serve in the manner of journals within housing 181 by a boss 234 extending laterally from wheel 212 configured in such a way as to accept and receive metal formed inserts 221, 223 into the circular boss journals. Insert can be formed internally in a cavity or externally to accept removable tools to apply rotational forces on opposing cylindrical boss journals 221, 223.

Wheels form or become a one piece unit that is not intended to be disassembled. Wheel 164 includes a disk-like element having a plurality of teeth 190 disposed at its perimeter and a plurality of radially aligned cavities 230 extending from a boss 232 to support the peripherally located teeth.

Spool 164 is rotatably mounted within housing 181 by a boss 232 extending laterally from wheel 210 and by a boss 234 extending laterally from wheel tooth 212, which bosses serve in the manner of journals. Each of these bosses nests within corresponding circular cavities through the formed housing 181. Cavity 208, for supporting boss 234, is illustrated in FIG. 11.

Housings 181, 183 are molded with an external endwall 177 or recessed cavities 121, 123 FIG. 7, 8. The formed extended endwalls forming the upper side of the housing incorporating inset cavities 169 creating rib supports for the endwalls 177 along with pin cavity 199 through opposing housings pin 179 secures the rope or webbing 199 formed in a loop or loops 204, 205, to allow terminal rope end 170 and rope extending from top of ratchet with hook 301, FIG. 32. To loop back over secured object and back to the housing loops 204, 205 to accommodate hook 153 FIGS. 32, and 174. This will avoid direct hook contact with finished materials such as handle bars, painted frame members or the like.

Embodiment 3

Includes a ratchet mechanism 310 configured to provide a mechanical advantage when tensioning the assembly described and embodied tensioning release assembly.

A ratchet 310, illustrated in FIG. 20, includes a housing 312 of moldable plastic or metal materials, which material is of sufficient robustness to withstand the loads imposed. Material suitable may include nylon, delron, carbon fiber, stainless steel, steel, aluminum or any of other known or to be developed molded plastic, molded metal, and rigid steel materials having high strength characteristics. A spool 314, rotatably mounted within housing 312, supports a cord 316 with steel non-cuttable cable or core 167 partially wrapped thereabout and having ends 318, 320 extending from the bottom of the ratchet. A handle lever and pawl assembly includes a formed pawl interferingly engaging with spool teeth formed on opposing pair of spool 340, 376 to prevent rotation of the spool in one direction and yet accommodate mechanical rotation of the spool in the other direction. A handle pawl assembly configured as an anti-theft mechanism 161, 163, 173, 175, FIGS. 10, 26, 32 with key style or combination tumbler style locks or the like, fixed handles 451, with or without rubber padding 61, and with a depressable pawl 322, with biased teeth 342, which pivot upon pin 346, and coiled spring 344 incorporating a guide pin 25 through pawl trigger to engage particularly formed housing cavities in locking position 416, ratcheting position 417, and releasing position 418. A hook 323, or permanently fixed molded, sewn, or swaged rope or webbing with hook permanently attached 301 extends from upper housing 348 to secure the ratchet to ring 324 or attachment point 24. The plan form of ratchet 310 is essentially variable tear drop shaped to provide a lateral balance from the point of suspension of the ratchet.

The upper portion of the body supports significantly sized land 347 to support the recessed cavity 333 formed with extended boss 41 incorporating cavity to receive bolt screw or rivet. The recessed cavity 436 configured to receive looped, formed, molded, sewn, or swaged rope and/or webbing 209 FIGS. 27, 32, 33 which can be pulled in opposing directions, allowing tension rope 320 to circle back to the body attaching to variable length loops 705 also allowing the housing hook or rope and/or webbing with hook to wrap around an attachment point and back to ratchet loop 704 giving a pulley like mechanical advantage.

The housing 310 has a first housing body 312 for a removable attachment to a second housing body 315 by connectors 133 such as fasteners, screws, or the like received within corresponding orifice cavities formed in each of the first housing body and the second housing body described with respect to FIGS. 20, 21. The bottom of the ratchet 310 includes a slotted opening 330, defined by the terminal end wall 332 and cavity 327 and terminal end wall and cavity 338. A cord 316 is partially wrapped about spool 314 with lengths 318 and 320 exiting through opening 330. Preferably, the length of opening 330, defined by terminal ends 332, 338 is less than the diameter of the part of the cord looped about spool 314 to urge the cord radially inwardly about the spools upon the application of pulling forces upon lengths 318 and 320 to mechanically engage the cord with the spool and prevent slippage there between. The spool includes a circumference of teeth 340 that are selectively engagable by a pair of centrally located body pawls or body pawl assembly 139 along with a shaft pin 459, coil spring 457, and opposing pawl 458 in the recessed body cavity 415 to prevent rotation of spool 314 in one direction; counter clockwise as illustrated in FIG. 21. A coil spring 344 biases rotatable handle pawl assembly 451 with two formed pivotable pawl triggers. Upon depressing the pawl trigger of the handle pawl assembly (see FIGS. 34, 35), the handle can be rotated back to the release position. The formed cavity in the bottom of the housing 418 will release body pawl, which allows the pawl to be guided through particularly formed cavities in the opposing housing assemblies FIGS. 21 and 27, 416, 417, and 418 allowing a locking position 416, ratcheting position 417, and release position 418. Locking position is when handle is down and facing the hook, the assembly is locking into the top most recessed cavity formed into the top rim of the opposing body housings through the guide pin of the pawl trigger locking the handle assembly in the down position disengaging the pawl trigger FIGS. 34 and 35, 525 from the spool gears. Grab the handle lever and depress the pawl while rotating the handle upward into second or middle formed recessed cavity FIGS. 34 and 35, 417 in the ratcheting position. Let go of the thumb lever and the guide pin will fall into the formed ratcheting cavity in the opposing housings which allows rotation of the spool in one direction, while body pawl trigger engages the spool's cooperating teeth rotating the spool and tensioning the rope. When releasing of the tension is required, depress the thumb release lever while fully rotating the handle to the back or bottom third formed release cavity FIGS. 34 and 35, 418 of housing. Release the thumb lever and allow the guide pin to engage the formed cavity in the opposing housings for release position. This disengages the handle lever from the cooperating spool teeth while simultaneously forcing the body pawl assembly out of ratcheting position from the cooperating spool teeth through timed arched edged contouring cams on both sides of the bottom of the handle lever plates engaging and forcing rotatable body pawl assembly outwardly extended from the boss journals of the spool and allows the spool to rotate freely.

A rod 348, which may be formed as part of the housing 312, supports hook 323, rope, or webbing with hook extension 301 from housing of ratchet FIGS. 32, 33.

To secure cord 316 with ratchet 310, the terminal end of the cord is inserted through opening 330 into the left side (with reference to FIG. 21) of spool 314. A curved but separately extending interior wall 350, forming in part away from outside housing 392 cavity within which the spool is housed, will support the terminal end of the cord about the spool. Insertion of the cord will be enhanced by manually rotating the spool in the clockwise direction by manipulating handle pawl and trigger and rotating through opening 352 of the housing. The terminal end of the cord is brought out from within the housing through opening 30. The resulting engagement is illustrated in FIG. 20-21.

Referring jointly to FIGS. 23, 24, 25, and 25A, details attendant spool 314 will be described. The spool includes wheels 362 and 360. Wheel 360 includes a plurality of ribs 364 extending outwardly from hub 366. Similar ribs 368 extend outwardly from hub 370 in wheel 362. Ribs 364, 368 may be rectangular, forming the primary rib from edge of the rectangular shaped rib configured with a square 90 degree angle surface on the ridge of the rib 355, 357 each ridge 213 preferably includes angled sides contouring having a greater degree of incline or slope along the outermost flared portion of the rib ridge 213 with a degree of incline decreasing along the length of the rib ridge 215 to the inner portion of the spool base surface of wheel 354, 356 illustrating a raised embossed pyramid, square, hex or the like texture 354 establishing from a smooth base surface 356 to a gripping like surface, giving the textured surface a mechanical advantage and gripping cord or rope as illustrated in FIGS. 22, 23. The extension or projection of the interior end of either type of rib would not extend through the axes of rotation, or the center hub, of the wheel; that is, none of the ribs nor any portion thereof are radial to the axis of rotation of the spool. Upon assembly of wheels 360, 362 with one another, it is preferable that the ribs of one wheel be offset or interleaved with the ribs of the other wheel to force the cord disposed there between into a serpentine configuration (see FIG. 41) to increase the mechanical interference between the cord and the spool, and to prevent slippage there between without unduly squeezing the cord and causing damage to some of the strands of the cord. To ensure proper alignment of the wheels about their common axes of rotation to interleave the ribs, a key 372 extends from hub 366 of wheel 360 and a mating keyway 374 for receiving key 372 is disposed in hub 374 of wheel 362. As illustrated in FIGS. 22, 23, key 372 is hexagonal, octagonal, or puzzle shaped in cross-section and keyway 374 is a hexagonal, octagonal, or puzzle shaped cavity. Passageway 367 extending through the center of wheel 314 is formed primarily to accept screws, lugs, or shafts, which are formed in octagon, hexagon, square, or the like shapes to pass through. After mating of key 372 with keyway 374, the respective ribs of wheels 360 and 362 will be in opposed interleaved relationship, as illustrated in FIGS. 6A, 25A, 22, 23. The two wheels may be permanently secured to one another by sonic welding, metal molded, casted, or threaded hex, octagonal shafts with boss journal end caps FIG. 38, 125, 127. End caps will have cavities formed with a hex, octagon, or square internal or external molded shapes or metal insert 302, 305. After such attachment through screw and nut or the like, the boss 382 extending laterally from wheel tooth 362, which bosses serve in the manner of journals within housing 312 by a boss 380 extending laterally from wheel 360 configured in such a way as to accept into the circular boss journals. Insert can be formed internally in a cavity 302, 305 or externally formed to accept removable tools to apply rotational forces on both sides of the spool's opposing cylindrical boss journals 305, 307.

Wheels form or become a one piece spool that is not intended to be disassembled. Wheel 360, 362 includes a disklike element having a plurality of teeth 340, 376 disposed at their perimeter and a plurality of radially aligned cavity holes 430, 431 extending from a boss 380 to support the peripherally located cooperating teeth.

Spool 314 is rotatably mounted within housing 312 by a boss 380 extending laterally from wheel 360 and by a boss 382 extending laterally from wheel tooth 362, which bosses serve in the manner of journals. The housing is enveloped 319 around the journal of the spool, having a cavity just large enough for tools to engage the spool cavity through formed housing 312, 384, which protects the spool boss journal from outside elements, or leaving cavity 384, open so supporting boss 382 is fully exposed, as is illustrated in FIGS. 20, 21.

Embodiment 4

Includes a ratchet mechanism 510 configured to provide a mechanical advantage when tensioning the assembly described and embodied tensioning release assembly FIGS. 26, 27. A ratchet 510, illustrated in FIG. 26, 27, includes a housing 512 of moldable plastic or metal materials, which material is of sufficient robustness to withstand the loads imposed. Material suitable may include nylon, delron, carbon fiber, stainless steel, steel, aluminum or any of other known or to be developed molded plastic, molded metal, and rigid steel materials having high strength characteristics. A spool 217, rotatably mounted within housing 512, supports a rope or cord 516 with a steel or non-cuttable cable or other non-cuttable core 167 that is partially wrapped thereabout and having end 536, extending from the bottom of the ratchet. Rope 53 extends out laterally along the inside of the tube axes, and exits out the right or left housing bodies through side rope discharge. A handle and pawl assembly includes a handle and pawl trigger 451, 522 interferingly engaging with spool teeth formed on opposing sides of spool 217 to prevent rotation of the spool in one direction and yet accommodate mechanical rotation of the spool in the other direction. A handle pawl assembly configured with anti-theft locking mechanisms FIGS. 10, 26, 32, 161, 163, 173, 175 with a key style or combination style lock or the like. The handles 451, with or without rubber padding 61, and with a depressable pawl 522, with biased teeth 542, which pivot upon pin 546, and coiled spring 344 incorporating a guide pin 525 through pawl trigger to engage particularly formed housing cavities in locking position 616, ratcheting position 617, and releasing position 618. A hook 301, or permanently fixed molded, sewn, or swaged rope or webbing with hook permanently attached 323 extends from upper housing 548 to secure the ratchet to ring 324 (not shown), attachment point FIG. 32, #24, or back to the fixed housing loop or loops. The plan form of ratchet 510 is essentially variable tear drop shaped to provide a lateral balance from the point of suspension of the ratchet.

The upper portion of the body supports significantly sized land 645 to support the recessed cavity 333 formed with extended boss 636 incorporating cavity to receive a bolt, screw, rivet, or permanent means of attachment. The recessed cavity 641 configured to receive looped, formed, molded, sewn, or swaged variable lengths of rope and/or webbing 209 which can be pulled in opposing directions, allowing tension rope 536 to circle around an attachment point and back to the contouring loops 705 of the body. This allows the housing rope and/or webbing with hook to wrap around an attachment point and back to the contouring loops FIG. 32, 704 of the body, giving a pulley like mechanical advantage.

The housing 510 has a first housing body 512 for a removable attachment to a second housing body 515 by connectors 133 such as: fasteners, screws, or the like received within corresponding cavities, formed in each of the first housing body and the second housing body described with respect to FIGS. 7, 8, 27. The bottom of the ratchet 510 includes a slotted opening 530, defined by the terminal end wall and cavity 534 and terminal end wall and cavity 538. A cord 516 is wrapped about center of spool 217 with length 516 exiting through boss journals 502, 505 of 751 of opening 53 exiting out laterally from center of spool 217 along the inside of the spool boss axes in either the right or left direction of body housing openings 519, as defined by terminal ends 534, 538 is less than the diameter of the part of the cord looped wrapped inside the U shaped valley spool 217 to urge the cord exiting from the tube boss axes 502, 505, and tube 751. Manually pull the rope or cord to remove the slack in the line (not shown). Depress handle thumb lever to release the lock and rotate the handle pawl to advance the cord or rope wrapping around the inside of the U shaped valley of the spool hub, supported with side wall flanges 513, 517. Spool supports tension rotatable inside opposing sides of U shaped valley on the external tube boss journals axes. The spool includes a circumference of plurality of teeth 308, 340 selectively engageble by a pair of centrally located body pawls or body pawl assembly 139 along with a shaft pin 659 and opposing pawl 219 in the recessed body cavity 225 to prevent rotation of spool 217 in one direction; counter clockwise as illustrated in FIG. 27. A coil spring 344 biases rotatable handle pawl assembly 522 with stamp formed or molded formed pawl trigger. Upon depressing pawl trigger of the handle pawl assembly, the handle can be rotated back to the cavity in the bottom of the housing 418 and will engage body pawl assembly 139 and handle pawl 451 in the counter clockwise direction as shown in FIG. 35. The handle pawl assembly is formed to the inside or outside of the pair of housings, and rotated pivotally around the outer diameter of the spool boss journals 580, 582 with designated recessed housing cavities FIG. 7, 584, 594 and pawl guide pin 525 and assisted by the opposing side of the arched raised cam ribs of the handle lever. This rotation forces the pivoting disengagement of the body pawl assembly 139 and the handle pawl trigger 542 with guide pin rest in opposing release cavities up and out of engagement FIG. 35, 83 allowing the spool to rotate freely.

A rod 548, which may be formed as part of the housing 512, supports hook 323, rope, or webbing with hook that extends 301 from housing of ratchet as illustrated in FIG. 32.

To secure cord 516 with ratchet 510, the terminal end of the cord is inserted through the inside of the U shaped valley center opening 77 by manually inserting the rope or cord either in the left or right direction laterally along the inside of the tube boss axes of spool and exiting either side of the body housings 519, 521. A curved but separate extending interior wall 596, forming in part away from outside housing 590, will guide the rope or cord when wrapped inside the U shaped valley spool. Insert the cord into the tube of the spool, pull the slack out of the rope, and rotate the handle pawl and trigger through opening 52 of the housing. The terminal end of the cord is wrapped inside the U shaped spool two or more wraps and brought out from within the housing through opening 530. The resulting engagement is illustrated in FIG. 27. The spool is comprised of one solid molded or multiple casted parts FIG. 39 forming a spool 217, 237 with a U shaped valley with a larger diameter boss tube journal axis 580, 582, the assembly embodiments comprises of a U shaped inner hub 751 with supporting flanges 513, 517 on and around the based formed tube shaft in the central part of the center spool hub and consists of one hole 519 adjoining the shaft from the U shaped valley where rope or cord enters manually, exposing rope through tube laterally along the axis, allowing the line to enter and be fed inside the shaft to either side of the wheel spool boss journals 751. The spool journal ends can be formed to receive internal or external octagon, hexagon, square, or the like embodiments shaped to accept removable tools from either side of the housing in the spool journal to apply mechanical rotative forces to rotate the spool for tensioning the rope or cord. Yet another assembly can comprise of pipe tube insert 86, 127 with a centrally configured hole 77 inserting and pressing together a pair of wheel flanged washer halves FIG. 38, 89, 91 with a circumference of wheel radius curving up and into the flat, thicker portion of supporting flanges forming a U shaped valley when pressed together with or without a plurality of spool gear teeth on opposing ends FIGS. 35, 38, 46. The spool is particularly formed with larger circumference laterally extending boss journal axis tube 86, 127 with a hollow interior, creating a tube running throughout the spool which can run horizontally or at an angle from center, and exiting out spool journal axis ends 1001 through outside of housing bodies. Journal pipe tubes can be formed with gear wheel 111 or inserts with octagon, hexagon, square, or the like cavities or shapes configured to accept removable tools internally or externally to apply rotational force of the wheel. Between the U shaped valleys is a hole 77 which connects to the hollow tube bosses 751 allowing rope to be fed through the center hole in the bottom of the U shaped valleys 509. The rope can be manually pushed to exit in either right or left direction of the wheel spool tube 751. Once the rope is fed through the center hole of the valley and exited from the wheel spool tube ends to wrap rope upon itself securing two or more wraps inside the U shaped valley of the spool into gripping position 85 without causing damage to rope or cord giving the spool greater capacities. Wheels formed or become a one piece unit that is not intended to be disassembled.

Wheel spool 217 is rotatably mounted within housing 512 by a boss 580 extending laterally from wheel 560 and by a boss 582 extending laterally from wheel tooth 562, which bosses serve in the manner of journals. Each of the ends of the pipe tube axle are square cavity notches 87 through ends to accept stamped, formed gear wheels FIGS. 39, 46 111, 13A that are formed without complete center bar. Instead, center is formed in such a way to engage the two ends allowing an external removable tool to apply rotational forces to the tube through the gear wheel. Each of these boss' nests within corresponding circular cavities 384, 394. The housing can be enveloped around the journal of the spool, having a cavity just large enough for tools to engage the spool cavity through formed housing 312, 384, which protects the spool boss journal from outside elements, or leaving cavity 384, open so supporting boss 382 is fully exposed, as is illustrated in FIGS. 26, 519, 582.

Embodiment 5

Referring to the FIGS. 36 through 52, a fastener is shown according to a first embodiment of the present invention.

The ratchet includes a frame 10A, a spool 12A, two ratchet gear wheels 13A, a handle 20A, a trigger 14A, and a handle plate 22A.

The frame 10A includes two walls on a floor. Each of the walls of the frame 10A includes a flare 102A in an end, two arched ridges 104A around the aperture 102A, a first arched edge 101A at the end, a second arched edge 106A, a cutout release 103A in the second cammed arched edge 106A, a ratcheting stop shoulder 108A between the cammed ratcheting position arched edges 101A and raised ribs 106A and a slot 109A therein.

The handle 20A includes two walls and a hand molded or assembled grip 21A between the walls. Each of the walls of the handle 20A includes a cam 202A at an end, a slot 203A therein and a boss cutout 204A thereon within the slot 203A. A circular aperture 201A is defined in each of the lever cams 202A.

The pipe tube spool 12A or boss journals with hexagon, octagon, formed inserts, or threaded bolts are rotationally inserted in the cavities 201A of the handle 20A and the cavities 102A of the frame 10A. The flared ridges 104A are inserted in the apertures 201A.

Each of the ratchet gears 13A includes ratchet teeth 131A. The ratchet gears 13A are non-rotationally connected to the slot cavity in the tube axis of the spool 12A.

The flat body plate 14A includes two fins 141A inserted through the body slots 109A of the walls of the body frame 10A for engagement with the ratchets 131A of the ratchet gear wheels 13A. A spring is compressed there between the flat plate 14A and a tab raised from the floor of the frame 10A for keeping the fins 141A engaged with the ratchets 131A.

The handle pawl plate 22A includes two fins 221A inserted through the slots 203A of the walls of the handle 20A for engagement with the ratchets 131A of the ratchet gear wheels 13A. The handle pawl plate 22A includes a grip 222A thereon and a flared tab aperture 223A therein.

A coil spring 23A is provided between the handle pawl plate 22A and a portion of the handle 20A for keeping the fins 221A engaged with the ratchets 131A. The spring 23A is a spring with a helical portion, a first end extending from the helical portion and a second end extending from the helical portion. The helical portion of the spring 23A is mounted on the lever slot boss 204A of the walls of the handle 20A. The first end of the spring 23A is located against the wall of the handle 20A. The second end of the spring 23A is inserted through the lever pawl plate aperture 223A of the second handle pawl 22A.

Referring to FIG. 42, 43, 44, rope or webbing 41A is connected to a rivet 11A provided between the walls of the body frame 10A while a second rope 40A is connected to the spool.

To fasten the rope 40A, the handle 20A is pivoted from the frame 10A. The ratchet spool tube shaft 13A, 15A rotated by the second handle pawl 22A connected to the handle 20A. The rotation of the spool 13A is allowed by the first body plate 14A moving on a flared cavity tab on the frame 10A. The rope 40A with side discharge is wound onto the U shaped spool 12A connected to the ratchet wheels 13A. When the handle 20A is pivoted towards the frame 10A, the second handle pawl 22A ratchets on the ratchet spool 13A while the first body plate 14A keeps the ratchet wheels 13A in position. The handle 20A is rotated back and forth with respect to the frame 10A so that the rope 40A, will rotatably tension.

To loosen the rope 40A, a user pulls the second handle plate up from the ratchet wheels 13A by the grip 222A. The user rotatably pivots the handle 20A from the frame 10A. The fins 221A are moved, past the ratcheting stop 108A, onto the second cammed arched edges 106A from the first cammed ratcheting arched edges 101A with the second arched edges 106A disengaging the fins 221A from the gear wheel teeth 131A and with the handle lever cams 202A, disengaging the fins 141A from the gear wheel teeth 131A. Thus, the second rope 40A can be reeled out.

The spool 12A is protected from the handle 20A by the body flare ridges 104A inserted in the cavities 201A that is, the tube spool 12A is not held by the handle 20A and the body frame 10A and therefore can easily be rotated. Multiple wheels can be configured to embody the different styles as described above. More specific details are incorporated.

Figure 46:
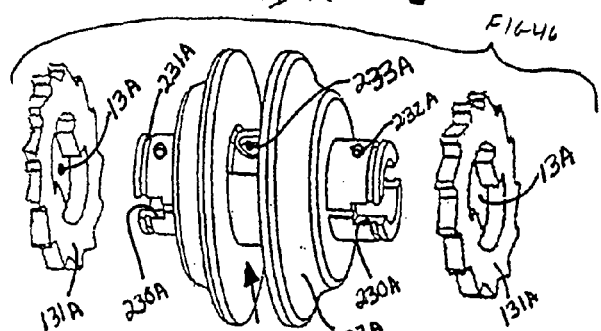
FIG. 46 is an exploded view of the spool shown in FIG. 42.
Figures 47A, 47B:
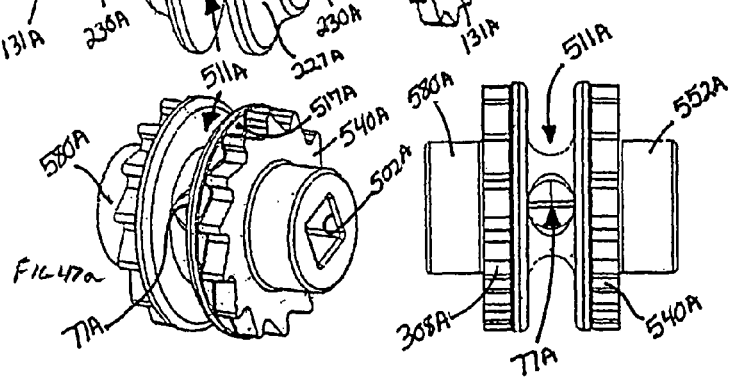
Figure 53A:
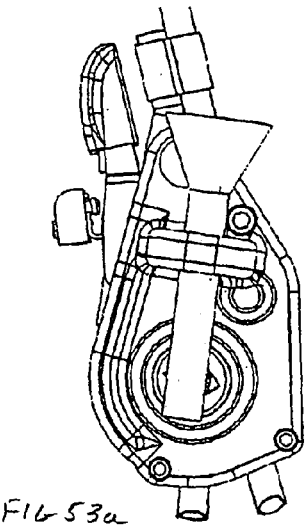
FIG. 53a is a side view of a ratchet with an attached holder for a flashlight.
Figure 53B:
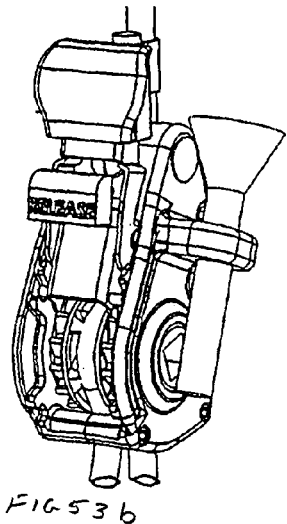
Figure 53C:
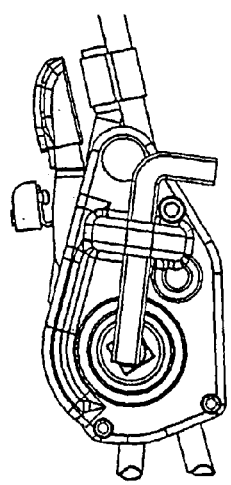
FIG. 53c is a side view of a ratchet with an attached holder for a tool.
Figure 53D:
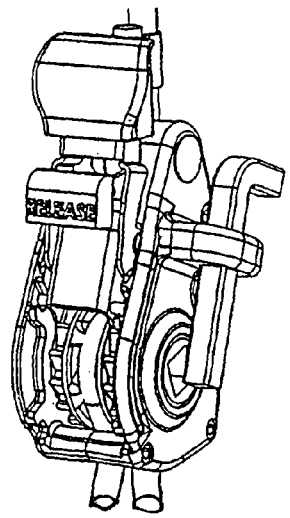
FIG. 53d is an isometric view of the ratchet shown in FIG. 53c.

Spool comprised of molded or casted part forming a spool 217A, 257A with a U shaped valley 511A which can comprise of a pipe tube insert 357A with a centrally configured hole 229A inserting and pressing together a pair of wheel flange halves FIG. 46, 227A, 228A with a circumference of wheel radius curving up and into the flat, thicker portion of supporting flanges of U shaped valleys when pressed together with gear teeth on opposing sides to form one embodied wheel or spool 217A, 237A with deeper smooth, ribbed, textured, U shaped valleys with or without a circumference of cooperating spool teeth on opposing sides of the spool. The spool is particularly formed with larger circumference laterally extending boss journal tube axes with a hollow interior, creating a tube 357A running throughout the spool which can run horizontally or at an angle from center, exiting out spool journal axis ends through outside of housing body. The tube journals can be formed with octagon, hexagon, square, or the like shaped cavities or inserts that are formed with a stamped gear wheel pressed on to the receiving slots 230A in the end of the tube axes with formed shapes for the gear wheel tube configuration held by the keyring groove and keeper ring or pins. The gear wheel plates are configured to accept removable tools internally or externally to apply rotational force of the tube wheel axis. Between the U shaped valleys is a hole 77A, 229A which connects to the hollow tube boss axis allowing rope to be manually fed through the center hole in the bottom of the U shaped valleys 77A, 229A. The rope can be manually pushed to exit in either the right or left direction of the wheel spool tube axis 560A. Once the rope is fed through the center hole of the valley and exited from the wheel, pull the slack out of the rope and rotate the spool to stack and wrap rope upon itself securing two or more wraps inside the U shaped valley of the spool into gripping position without causing damage to rope or cord and giving the spool greater capacities.

Embodiment 6

Referring to the FIGS. 48 through 52, a fastener is shown according to a first embodiment of the present invention.

The ratchet includes a frame 10A, a spool 87A, two ratchet gear wheels 13A, a handle 20A, a trigger 14A, and a handle plate 22A.

The frame 10A includes two walls on a floor. Each of the walls of the frame 10A includes a flare 102A in an end, two arched ridges 104A around the aperture 102A, a first arched edge 101A at the end, a second arched edge 106A, a cutout release 103A in the second cammed arched edge 106A, a ratcheting stop shoulder 108A between the cammed ratcheting position arched edges 101A and raised ribs 106A and a slot 109A therein.

The handle 20A includes two walls and a hand molded or assembled grip 21A between the walls. Each of the walls of the handle 20A includes a cam 202A at an end, a slot 203A therein and a boss cutout 204A thereon within the slot 203A. A circular aperture 201A is defined in each of the lever cams 202A.

The pipe tube spool 87A or boss journals with hexagon, octagon, formed inserts, or threaded bolts are rotationally inserted in the cavities 201A of the handle 20A and the cavities 102A of the frame 10A. The flared ridges 104A are inserted in the apertures 201A.

Each of the ratchet gears 13A includes ratchet teeth 131A. The ratchet gears 13A are non-rotationally connected to the slot cavity in the tube axis of the spool 87A.

The flat body plate 14A includes two fins 141A inserted through the body slots 109A of the walls of the body frame 10A for engagement with the ratchets 131A of the ratchet gear wheels 13A. A spring is compressed there between the flat plate 14A and a tab raised from the floor of the frame 10A for keeping the fins 141A engaged with the ratchets 131A.

The handle pawl plate 22A includes two fins 221A inserted through the slots 203A of the walls of the handle 20A for engagement with the ratchets 131A of the ratchet gear wheels 13A. The handle pawl plate 22A includes a grip 222A thereon and a flared tab aperture 223A therein.

A coil spring 23A is provided between the handle pawl plate 22A and a portion of the handle 20A for keeping the fins 221A engaged with the ratchets 131A. The spring 23A is a spring with a helical portion, a first end extending from the helical portion and a second end extending from the helical portion. The helical portion of the spring 23A is mounted on the lever slot boss 204A of the walls of the handle 20A. The first end of the spring 23A is located against the wall of the handle 20A. The second end of the spring 23A is inserted through the lever pawl plate aperture 223A of the second handle pawl 22A.

Referring to FIGS. 48, 49, rope or webbing 88A is connected to a rivet 11A provided between the walls of the body frame 10A while a second rope 89A is connected to the spool.

To fasten the rope 88A, 89A, the handle 20A is pivoted from the frame 10A. The ratchet spool boss journals 87A are rotated by the second handle pawl 22A connected to the handle 20A. The rotation of the spool gear 13A is allowed by the first body plate 14A moving on a flared cavity tab on the frame 10A. The rope 88A wraps partially around the ratchet wheels 87A. When the handle 20A is pivoted towards the frame 10A, the second handle pawl 22A ratchets on the ratchet spool 13A while the first body plate 14A keeps the ratchet wheels 13A in position. The handle 20A is rotated back and forth with respect to the frame 10A so that the rope 88A, will rotatably tension.

To loosen the rope 88A, a user pulls the second handle plate up from the ratchet wheels 13A by the grip 222A. The user rotatably pivots the handle 20A from the frame 10A. The fins 221A are moved, past the ratcheting stop 108A, onto the second cammed arched edges 106A from the first cammed ratcheting arched edges 101A with the second arched edges 106A disengaging the fins 221A from the gear wheel teeth 131A and with the handle lever cams 202A disengaging the fins 141A from the gear wheel teeth 131A. Thus, the rope 88A, 89A can be released.

The spool 87A is protected from the handle 20A by the body flare ridges 104A inserted in the cavities 201A that is, the spool 87A is not held by the handle 20A and the body frame 10A and therefore can easily be rotated. Multiple wheels can be configured to embody the different styles as described above. More specific details are incorporated.

Referring jointly to FIGS. 24, 48 through 52, details attendant spool 87A will be described. The spool includes wheels 362A and 360A. Wheel 362A includes a plurality of ribs 368A extending outwardly from hub 370A. Similar ribs 364A extend outwardly from hub 366A in wheel 360A. Rectangular ribs 364A, 368A configured with a 90 degree edge surface on the ridge of the rib 213A, 215A preferably includes angled sides contouring having a greater degree of incline or slope along the outermost flared portion of the rib ridge 215A with a degree of incline decreasing along the length of the rib ridge 213A to the inner portion of the spool base surface of the wheel 360A, 362A illustrating a raised pyramid, square, hex or the like texture establishing from a smooth surface to a gripping like surface, giving the textured surface a mechanical advantage and gripping cord or rope as illustrated in FIGS. 22, 23, 41. In either event, an imaginary extension or projection of the interior end of either type of rib would not extend through the axes of rotation, or the center, of the respective wheel; that is, none of the ribs nor any portion thereof are radial to the axis of rotation of the spool. Upon assembly of wheels 360A, 362A with one another, it is preferable that the ribs of one wheel be offset or interleaved with the ribs of the other wheel to force the cord disposed there between into a serpentine configuration (note FIG. 41) to increase the mechanical interference between the cord and the spool and to prevent slippage there between without unduly squeezing the cord and causing damage to some of the strands of the cord. To ensure proper alignment of the wheels about their common axes of rotation to interleave the ribs, a key 372A extends from hub 366A of wheel 360A and a mating keyway 374A for receiving key 372A is disposed in hub 370A of wheel 362A. As illustrated, key 372A is hexagonal, octagon, or puzzle shaped in cross-section and keyway 374A is a hexagonal, octagon, or puzzle shaped cavity. Passageway 367A extending through the center of wheel 360A is formed primarily to accept screws, threaded lug shafts, shafts, formed in octagon, hexagon, square, or the like to pass through passageway 369A extends through the center of wheel 362A for the same purpose. After mating of key 372A with keyway 374A, the respective ribs of wheels 360A and 362A will be in opposed interleaved relationship, as illustrated in FIG. 49. The two wheels may be permanently secured to one another by pressed, metal molded, casted, or threaded hex, octagonal shafts with boss journal end caps 125A, 127A of FIG. 38, 39. End caps will have cavities formed with a hex, octagon, or square internal or external molded, shaped, or inserted configuration 302A, 305A or the like. After such attachment, the boss 382A extending laterally from wheel 362A, which tube bosses serve in the manner of journals within housing 12A by a boss 380A extending laterally from wheel 360A configured in such a way as to accept and receive formed shapes or metal formed inserts 302A, 305A into the circular tube boss journals. Insert can be formed internally in a tube cavity or externally for tube slots connecting to gear wheel plate to the tube to accept removable tools to apply rotational forces on boss journals.

Wheels form or become a one piece unit that is not intended to be disassembled. Wheel 362A includes a disk-like element having a plurality of teeth 340A disposed at its perimeter and a plurality of radially aligned spokes or pin cavities 430A, 431A extending from a boss 380A, 382A to support the peripherally located teeth. Boss axes can accept stamped or formed gear wheels that can be fixed or pressed to the tube formed slots 107A, 109A, 125A, 127A of FIG. 38 on opposing ends of the tube axes.

Spool 87A is rotatably mounted within housing 12A by a boss 380A extending laterally from wheel 360A and by a boss 382A extending laterally from wheel 362A, which bosses serve in the manner of journals. Each of these bosses nests within corresponding circular cavities through the formed housing 12A and handle lever cavities 201A, for supporting boss 382A, is illustrated in 48.

The permanent nature of the assembly process prevents a user from disassembling the ratchet or removing any part thereof without destroying the ratchet. Such impediment to disassembly or modification increases and enhances the useful life of the ratchet. Should a failure occur, the ratchet should be discarded without an attempt of repair to ensure that failure resulting in potentially catastrophic results does not occur.

While the principles of the invention have now been made clear in an illustrative embodiment, there will be immediately obvious to those skilled in the art many modifications of structure, arrangement, proportions, elements, materials and components used in the practice of the invention which are particularly adapted for specific environments and operating requirements without departing from those principles.

I claim:

1. A ratchet, said ratchet comprising in combination:
    (a) a housing for supporting a cord engageable spool and including a thumb release for selectively limiting rotation of said spool in one direction and for releasing said spool to rotate in either direction;
    (b) said spool having an axis of rotation and comprising a first wheel and a second wheel, a key and a keyway formed as integral parts of said first and second wheels, respectively, for securing said first and second wheels with one another to prevent relative rotation therebetween, a plurality of first ribs formed on a surface of said first wheel in opposed and interleaved relationship with a plurality of second ribs formed on a surface of said second wheel to grip the cord, each of said first and second ribs including an inner end and an outer end, a first boss formed as part of and extending laterally from said first wheel and through a first spool journal within a first body of said housing along the axis of rotation of said spool and a second boss formed as part of and extending laterally from said second wheel and through a second spool journal within a second body of said housing along the axis of rotation of said spool;
    (c) said first and second spool journals being disposed in and extending through corresponding ones of said first and second bodies of said housing and in opposed relationship for rotatably receiving and supporting said first and second bosses to rotatably support said spool within said housing; and
    (d) a third cavity formed in said first boss for access to a tool through said first body of said housing to assist in rotating said spool and a fourth cavity formed in said second boss for access to said tool through said second body of said housing to assist in rotating said spool.

2. The ratchet as set forth in claim 1 wherein said first wheel includes a first hub and wherein the inner end of each rib of said first plurality of ribs terminates at said first hub and wherein said second wheel includes a second hub and wherein the inner end of each rib of said second plurality of ribs terminates at said second hub.

3. The ratchet as set forth in claim 1 wherein each rib of said first and second plurality of ribs is configured such that an imaginary interiorly oriented projection of each rib of said first and second plurality of ribs would not intersect the axis of rotation of said spool.

4. The ratchet as set forth in claim 1 wherein each rib of said first and second plurality of ribs is non-radially oriented.

5. The ratchet as set forth in claim 1 wherein each rib of said first and second plurality of ribs is a non-radial rectilinear rib.

6. The ratchet as set forth in claim 1 wherein each of said housing and said spool is formed of plastic material.

7. The ratchet as set forth in claim 1 wherein said spool is journalled within said housing solely by said first and second bosses disposed within said first and second spool journals, respectively.

8. A ratchet, said ratchet comprising in combination:
    (a) a housing for supporting a cord engageable spool and including a thumb release for selectively limiting rotation of said spool in one direction and for releasing said spool to rotate in either direction;
    (b) said spool having an axis of rotation comprising in combination a pair of wheels interconnected with one another to prevent relative rotation therebetween, a pair of bosses extending from opposed sides of said spool and centered along the axis of rotation for rotatably supporting said spool; and (c) a pair of opposed journals disposed in and extending through the side walls of said housing and enabled to rotatably engage said pair of bosses to rotatably support said spool within said housing, each journal of said pair of journals including a circular wall; and (d) a first cavity formed in a first boss of said pair of bosses for receiving a tool from without said housing to assist in rotation of said spool and a second cavity formed in a second boss of said pair of bosses for receiving said a-tool from without said housing to assist in rotation of said spool.

9. The ratchet as set forth in claim 8 including a first and second plurality of rectilinear ribs formed as part of said first and second wheels, respectively, to engage from opposed sides a cord partially extending about said spool.

10. The ratchet as set forth in claim 9 wherein each rib of said first and second plurality of ribs is non-radial with respect to the axis of rotation of said spool.

11. The ratchet as set forth in claim 8 wherein said housing, said spool and said bosses rotatably supporting said spool within said housing are of plastic material.

12. The ratchet as set forth in claim 8 wherein said spool includes a passageway extending therethrough along the axis of rotation to reduce an amount of plastic material and minimize shrinkage upon curing of the plastic material.

13. The ratchet as set forth in claim 8 including a key and a mating keyway for joining said first and second wheels with one another to preclude relative rotation therebetween.

14. A ratchet, said ratchet comprising in combination:

(a) a housing for supporting a cord engageable spool and including a thumb release for selectively limiting rotation of said spool in one direction and for releasing said spool to rotate in either direction;

(b) said spool having an axis of rotation comprising in combination a pair of wheels interconnected with one another to prevent relative rotation therebetween;

(c) a first and second plurality of ribs formed as part of said first and second wheels, respectively, adapted to engage from opposed sides a cord partially extending about said spool;

(d) a pair of bosses extending from opposed sides of said spool and centered along the axis of rotation;

(e) a pair of opposed spool journals disposed within opposed walls of said housing and enabled to rotatably engage said bosses to rotatably support said spool within said housing, each spool journal of said pair of spool journals including a circular wall and providing access to said pair of bosses from outside of said housing; and (f) a first cavity formed in a first boss of said pair of bosses for receiving a tool to assist in rotation of said spool and a second cavity formed in a second boss of said pair of bosses for receiving said tool to assist in rotation of said spool.

15. The ratchet as set forth in claim 14 wherein each said circular wall is a cylindrical wall.

* * * * *